United States Patent
Das Sharma

(10) Patent No.: US 11,397,701 B2
(45) Date of Patent: Jul. 26, 2022

(54) RETIMER MECHANISMS FOR IN-BAND LINK MANAGEMENT

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 417 days.

(21) Appl. No.: 16/399,898

(22) Filed: Apr. 30, 2019

(65) Prior Publication Data

US 2019/0258600 A1   Aug. 22, 2019

(51) Int. Cl.

| | | |
|---|---|---|
| G06F 13/42 | (2006.01) | |
| G06F 11/07 | (2006.01) | |
| G06F 13/20 | (2006.01) | |
| H04Q 11/04 | (2006.01) | |
| G06F 13/40 | (2006.01) | |

(52) U.S. Cl.
CPC ...... *G06F 13/4291* (2013.01); *G06F 11/0745* (2013.01); *G06F 11/0757* (2013.01); *G06F 11/0772* (2013.01); *G06F 11/0778* (2013.01); *G06F 13/20* (2013.01); *G06F 13/4045* (2013.01); *H04Q 11/04* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 7,474,612 | B1 * | 1/2009 | Patel | H04J 3/062 370/217 |
| 10,671,476 | B2 * | 6/2020 | Froelich | G06F 11/08 |
| 10,747,688 | B2 * | 8/2020 | Jen | G06F 13/4282 |
| 10,771,189 | B2 * | 9/2020 | Das Sharma | H04L 1/0041 |
| 10,784,986 | B2 * | 9/2020 | Das Sharma | H04L 1/007 |
| 10,789,201 | B2 * | 9/2020 | Wu | G06F 15/16 |
| 10,853,212 | B2 * | 12/2020 | Das Sharma | G06F 11/221 |
| 10,866,625 | B2 * | 12/2020 | Schneider | H04W 52/0216 |

(Continued)

FOREIGN PATENT DOCUMENTS

| | | | |
|---|---|---|---|
| CN | 110035015 A | * 7/2019 | |
| DE | 102018128569 A1 | * 7/2019 | G06F 13/4282 |

(Continued)

OTHER PUBLICATIONS

EPO; Partial European Search Report issued in EP Patent Application No. EP 20155581.0, dated Jul. 30, 2020; 16 pages.

(Continued)

*Primary Examiner* — Steven G Snyder
(74) *Attorney, Agent, or Firm* — Alliance IP, LLC

(57) ABSTRACT

A retimer apparatus can include a receiver circuit implemented at least partially in hardware; a configuration register comprising a link management bit set, and one or more bit fields for link management bits indicating link management information; bit stream logic implemented at least partially in hardware to encode an ordered set (OS) with one or more link management bits from the configuration register; and a transmitter circuit implemented at least partially in hardware to transmit OS with the one or more link management bits across a link.

23 Claims, 16 Drawing Sheets

(56) References Cited

U.S. PATENT DOCUMENTS

| | | | |
|---|---|---|---|
| 10,880,137 B2* | 12/2020 | Das Sharma | H04L 27/01 |
| 11,005,692 B2* | 5/2021 | Das Sharma | H04L 27/01 |
| 2016/0179647 A1 | 6/2016 | Sharma et al. | |
| 2016/0283428 A1* | 9/2016 | Guddeti | G06F 13/4022 |
| 2016/0377679 A1* | 12/2016 | Froelich | G01R 31/31703 |
| | | | 714/735 |
| 2017/0017604 A1* | 1/2017 | Chen | G06F 13/4221 |
| 2017/0270062 A1* | 9/2017 | Sharma | G06F 13/4286 |
| 2017/0371831 A1* | 12/2017 | Das Sharma | G06F 13/4068 |
| 2018/0181502 A1* | 6/2018 | Jen | G06F 13/4282 |
| 2018/0225233 A1* | 8/2018 | Das Sharma | G06F 13/4286 |
| 2018/0248650 A1* | 8/2018 | Das Sharma | H04L 1/0041 |
| 2018/0253398 A1* | 9/2018 | Wu | G06F 15/16 |
| 2018/0267850 A1* | 9/2018 | Froelich | G06F 11/1004 |
| 2018/0285227 A1* | 10/2018 | Sharma | H04L 69/323 |
| 2018/0329855 A1* | 11/2018 | Das Sharma | G06F 13/4295 |
| 2018/0331864 A1* | 11/2018 | Das Sharma | H04L 25/03 |
| 2019/0034376 A1* | 1/2019 | Das Sharma | G11C 29/028 |
| 2019/0042380 A1* | 2/2019 | Das Sharma | G06F 13/4295 |
| 2019/0052617 A1* | 2/2019 | Chen | H04L 9/3265 |
| 2019/0121417 A1* | 4/2019 | Schneider | H04W 52/0216 |
| 2019/0149265 A1* | 5/2019 | Das Sharma | H04L 1/0041 |
| | | | 714/776 |
| 2019/0305888 A1* | 10/2019 | Das Sharma | H04L 1/0057 |
| 2019/0340146 A1* | 11/2019 | Chen | G06F 13/4072 |
| 2020/0145341 A1* | 5/2020 | Das Sharma | H04L 1/08 |
| 2020/0226018 A1* | 7/2020 | Das Sharma | H04L 1/0045 |
| 2020/0313940 A1* | 10/2020 | Das Sharma | H04L 27/01 |
| 2020/0364108 A1* | 11/2020 | Froelich | G06F 11/1004 |
| 2020/0364129 A1* | 11/2020 | Das Sharma | G06F 11/3027 |
| 2020/0374037 A1* | 11/2020 | Das Sharma | H04L 1/0076 |
| 2021/0013999 A1* | 1/2021 | Choudhary | H04L 47/31 |
| 2021/0050941 A1* | 2/2021 | Das Sharma | H04L 1/0057 |
| 2021/0081288 A1* | 3/2021 | Das Sharma | G06F 11/221 |
| 2021/0089418 A1* | 3/2021 | Das Sharma | G06F 11/221 |
| 2021/0391973 A1* | 12/2021 | Jeon | H04B 15/02 |

FOREIGN PATENT DOCUMENTS

| | | | | |
|---|---|---|---|---|
| DE | 112018001088 T5 * | 11/2019 | | H04L 41/069 |
| EP | 3697007 A1 * | 8/2020 | | H04L 1/0061 |
| EP | 3739459 A1 * | 11/2020 | | H04L 47/34 |
| EP | 3734463 A3 * | 12/2020 | | G06F 11/0772 |
| WO | 2015099733 A1 | 7/2015 | | |
| WO | WO-2015099724 A1 * | 7/2015 | | G06F 13/36 |
| WO | WO-2015099733 A1 * | 7/2015 | | G06F 11/221 |
| WO | WO-2017052665 A1 * | 3/2017 | | H04L 1/0061 |
| WO | WO-2017165056 A1 * | 9/2017 | | G06F 13/4286 |
| WO | WO-2018118304 A1 * | 6/2018 | | G06F 13/161 |
| WO | WO-2018160497 A1 * | 9/2018 | | G06F 15/17343 |
| WO | WO-2018209311 A1 * | 11/2018 | | H04L 27/01 |

OTHER PUBLICATIONS

EPO; Extended European Search Report issued in EP Patent Application No. 20155581.0, dated Nov. 12, 2020; 19 pages.

* cited by examiner

RETIMER MECHANISMS FOR IN-BAND LINK MANAGEMENT

BACKGROUND

Interconnects can be used to provide communication between different devices within a system, some type of interconnect mechanism is used. One typical communication protocol for communications interconnects between devices in a computer system is a Peripheral Component Interconnect Express (PCI Express™ (PCIe™)) communication protocol. This communication protocol is one example of a load/store input/output (I/O) interconnect system. The communication between the devices is typically performed serially according to this protocol at very high speeds.

Devices can be connected across various numbers of data links, each data link including a plurality of data lanes. Upstream devices and downstream devices undergo link training upon initialization to optimize data transmissions across the various links and lanes.

DETAILED DESCRIPTION

Figure 1:
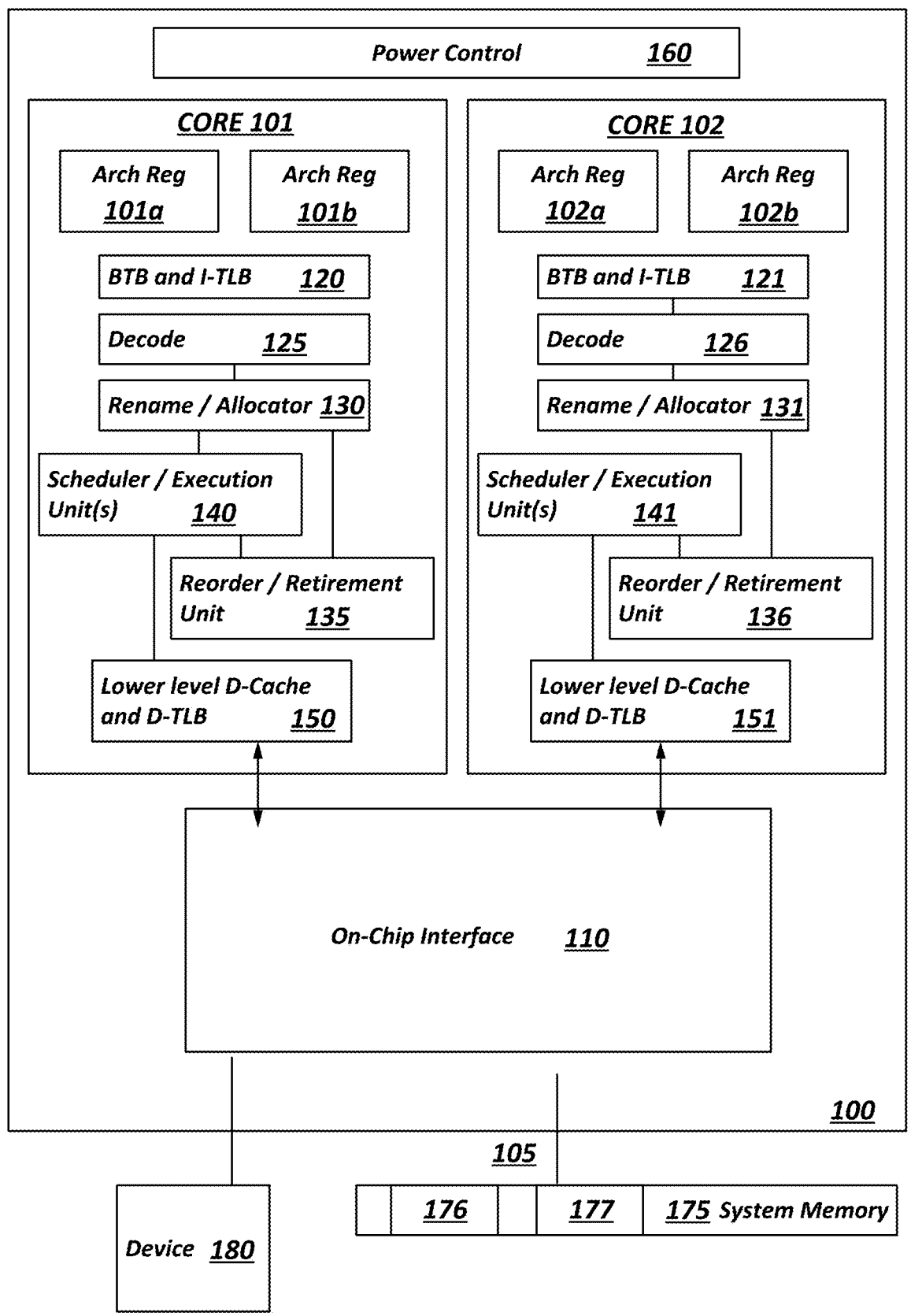
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/ resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or includes an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point Link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

PCIe retimers that only include physical layer elements are architecturally transparent devices. Such retimers primarily pass through information between upstream and downstream connected devices. While retimers can report parity errors in each link segment in the SKP Ordered Sets (OS), to help identify the link segment that sees an error, retimers can benefit from enhancements to allow retimers to proactively participate in the predictive error management by proactively taking the link to a Recovery state or requesting a re-equalization or lower speed of operation. As interconnects are deployed in a wide range of industrial and automotive applications where the operating conditions can change fairly drastically, the lack of proactive link management by retimers will be a limitation. This disclosure describes a mechanism for the retimer to initiate link management handshake by proactively sending command/status by manipulating the control skip ordered sets (SKP OS). Some embodiments address low-latency retimers where the retimer loses the ability to report parity errors and to participate in lane margining. This disclosure describes architected error logging mechanisms in the retimer that can be accessed using inband as well as sideband mechanisms.

Advantages of the present disclosure are readily apparent to those of skill in the art. Among the advantages of the present disclosure include allowing retimers to request link retraining (or re-equalization) without the retimer having to experience errors. Also in the low-latency mode, this disclosure provides an in-band mechanism for the retimer to report its parity computation so that the link partner can identify the link segment that had the error.

Embodiments of this disclosure include mechanisms to enhance the control SKP OS in the upstream direction (generated by an Up Stream Port (USP)) with circuitry and/or software functionality in the retimer to inject link management commands and corresponding responses coming from the Down Stream Port (DSP) in the downstream direction. The retimers can take proactive actions against failures before the errors physically manifest as bit errors with the potential to cause data corruption. Retimers can participate in making power management requests.

In the low-latency mode, embodiments include a mechanism for accessing error logs. In Compute Express Link (CXL), for example, and in some PCIe interconnects, that uses a fixed interval for Control SKP OS, a mechanism is described herein for the Retimer to manipulate the Control SKP OS even in low-latency mode. In low-latency mode, the retimer can participate in error logging and reporting as well as in receiver margining, thereby increasing platform reliability.

Figure 2A:
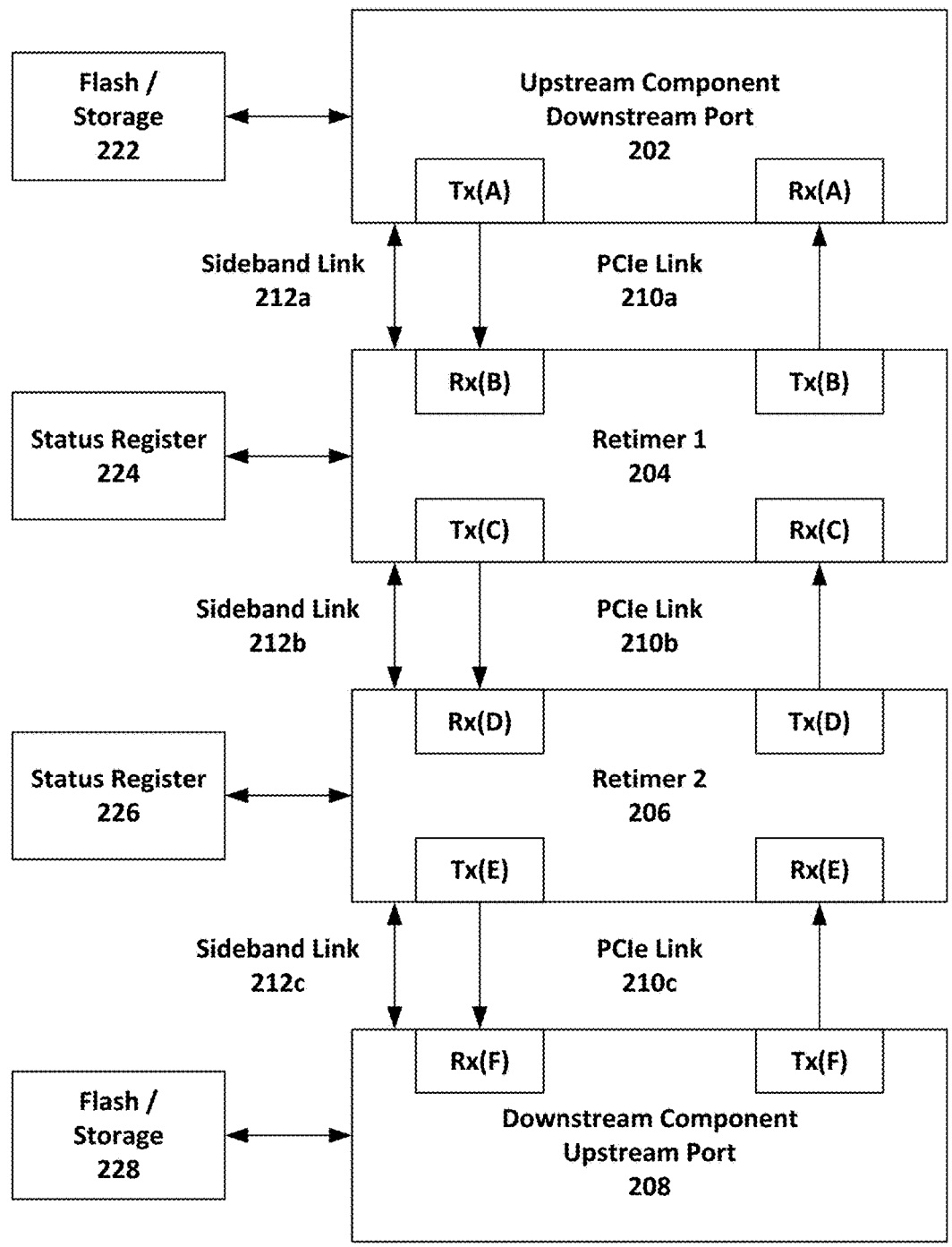
FIG. 2A is a schematic diagram of an interlinked system that includes two retimers in accordance with embodiments of the present disclosure.

FIG. 2A is a schematic and timing diagram illustrating a sample topology 200 with two re-timers 204 and 206 between an upstream component downstream port 202 and a downstream component upstream port 208 in accordance with embodiments of the present disclosure. The upstream component downstream port 202 can be a port for a PCIe-based device, such as a CPU or other device capable of generating a data packet and transmitting the data packet across a data Link compliant with the PCIe protocol. The downstream component upstream port 208 can be a port for a peripheral component that can receive a data packet from a Link compliant with the PCIe protocol. It is understood that the upstream component downstream port 202 and the downstream component upstream port 208 can transmit and receive data packets across PCIe Link(s), illustrated as PCIe Link 210a-c.

The topology 200 can include one or more retimers 204 and 206. Retimers 204 and 206 can serve as a signal repeater operating at the physical layer to fine tune the signal from the upstream component 202 and/or the downstream component upstream port 208. A retimer can use Continuous Time Linear Equalization (CTLE), Decision Feedback Equalization (DFE), and transmit an impulse response equalization (Tx FIR EQ, or just TxEQ). Re-timers are transparent to the data Link and transaction layers but implement the full physical layer.

The multi-Lane PCIe Link is split into three Link segments (LS) 210a, 210b, and 210c in each direction. The upstream component downstream port 202 can be coupled to retimer1 204 by a multi-Lane PCIe Link 210a. The retimer 1 204 can be coupled to retimer 2 206 by link segment 210b. And retimer 2 206 can be coupled to downstream component upstream port 208 by link segment 210c.

Components can also be coupled by sideband linkages. The upstream component downstream port 202 can be coupled to retimer1 204 by a sideband link 212a. The retimer 1 204 can be coupled to retimer 2 206 by sideband link 212b. And retimer 2 206 can be coupled to downstream component upstream port 208 by sideband link 212c.

A primary function of a retimer (buffer) device is signal re-timing. These functions are performed by retimers 204 and 206. The particular retimer device circuits will depend on the PHY being used for the link. Generally, retimer circuitry is configured to recover the incoming signal and retransmit using a local clock and new transmit equalization circuitry, and may typically employ well-known circuitry for this purpose, such as phase lock loops. A retimer may further comprise transmitter and receiver circuitry including one or more amplifier circuits, as well as various types of well-known signal-conditioning circuitry used to increase the drive level of a received signal. Such retimer circuitry is well-known to those skilled in the high-speed interconnect arts, and, accordingly, no further details are shown or discussed herein.

Each retimer 204 and 206 can have an upstream path and a downstream path. In some implementations, a retimer can include two pseudo ports, and the pseudo ports can determine their respective downstream/upstream orientation dynamically. Further, retimers 204 and 206 can support operating modes including a forwarding mode and an executing mode. Retimers 204 and 206 in some instances can decode data received on the sub-link and re-encode the data that it is to forward downstream on its other sublink. As such, retimers may capture the received bit stream prior to regenerating and re-transmitting the bit stream to another device or even another retimer (or redriver or repeater). In some cases, the retimer can modify some values in the data it receives, such as when processing and forwarding ordered set data. Additionally, a retimer can potentially support any width option as its maximum width, such as a set of width options defined by a specification such as PCIe.

As data rates of serial interconnects (e.g., PCIe, UPI, USB, etc.) increase, retimers are increasingly used to extend the channel reach. Multiple retimers can be cascaded for even longer channel reach. It is expected that as signal speeds increase, channel reach will typically decrease as a general matter. Accordingly, as interconnect technologies accelerate, the use of retimers may become more common. As an example, as PCIe Gen-4, with its 16 GT/s, is adopted in favor of PCIe Gen-3 (8 GT/s), the use of retimers in PCIe interconnects may increase, as may be the case in other interconnects as speeds increase.

In one implementation, a common BGA (Ball Grid Array) footprint may be defined for PCI Express Gen-4 (16 GT/s) based retimers. Such a design may address at least some of the example shortcomings found in conventional PCIe Gen-3 (8 GT/s) retimer devices, as well as some of the issues emerging with the adoption of PCIe Gen-4. Further, for PCIe Gen-4, the number of retimer vendors and volume are expected to increase. Due to signal losses from the doubled data rate (from 8 GT/s to 16 GT/s), the interconnect length achievable is significantly decreased in Gen-4. In this and other example interconnect technologies, as data rate increases, retimers may thereby have increased utility as they can be used to dramatically increase channel lengths that would be otherwise constrained by the increased data rate.

Although shown to be separate from the upstream component and downstream component, the retimer can be part of the upstream or downstream components, on board with the upstream or downstream components, or on package with the downstream component.

The upstream component downstream port 202 can have access to a storage element 222, such as a flash storage, cache, or other memory device. The retimer 1 204 can optionally include a status register 224. The status register 224 can also be used as an error log register in the retimers. For example, while the retimer (or link in general) is operating in low latency mode, the retimer 204 can store bit errors or parity errors for transmission to the DSP, e.g., via sideband link 212*a* or by in-band links after the link is placed into normal (or non-low latency) mode. The retimer 2 206 can optionally include a similar status register 226. The downstream component upstream port 208 can optionally include a storage element 228.

Figure 2B:
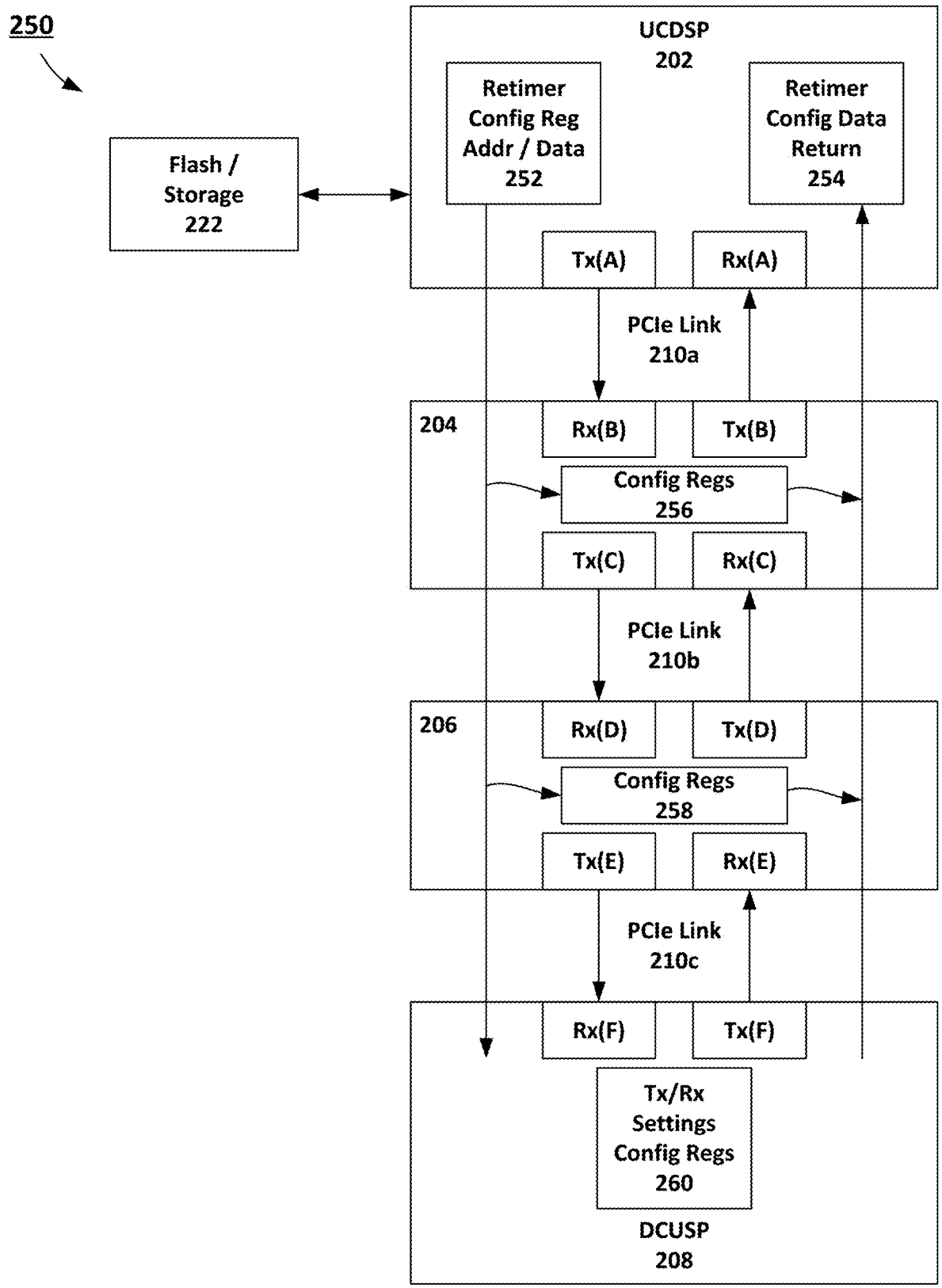
FIG. 2B is a schematic diagram of a connected system that illustrates in-band upstream port and retimer configuration in accordance with embodiments of the present disclosure.

FIG. 2B is a schematic diagram of a connected system 250 that illustrates in-band upstream port and retimer configuration in accordance with embodiments of the present disclosure. As shown in FIG. 2A, an upstream component downstream port 202 can be coupled to the downstream component upstream port 208 by a link 210*a-c* that is extended by two retimers 204, 206. In this example, the downstream port 202 can be provided with a retimer configuration register address/data register 252 to hold data to be sent in a configuration access command to one of the two retimers using fields of an enhanced SKP OS. One or more bits of the SKP OS can include a link information, such as link control payload or link control command code, data, or an address stored at a configuration register (e.g., 256, 258) of a retimer (e.g., 204, 206, respectively) to read or write data from/to the register 256, 258. Retimers can generate link control commands and sent link control commands upstream by encoding data in an instance of an enhanced SKP OS. Data encoded by the retimer (e.g., 204, 206) may be extracted at the downstream port and recorded in a retimer configuration data return register (e.g., 254). The registers (e.g., 252, 254) maintained at the upstream device downstream port 202 can be written to and read from by system software and/or other components of the system allowing (indirect) access to the retimer registers: one register (e.g., 252) conveying the address/data/command to the retimer and a second register (e.g., 254) that stores the responses coming back from the re-timer. In other implementations, such registers (e.g., 260) can be maintained at the downstream component upstream port 208 instead of or in addition to the registers being maintained at the upstream component downstream port 202, among other examples.

Figure 3:
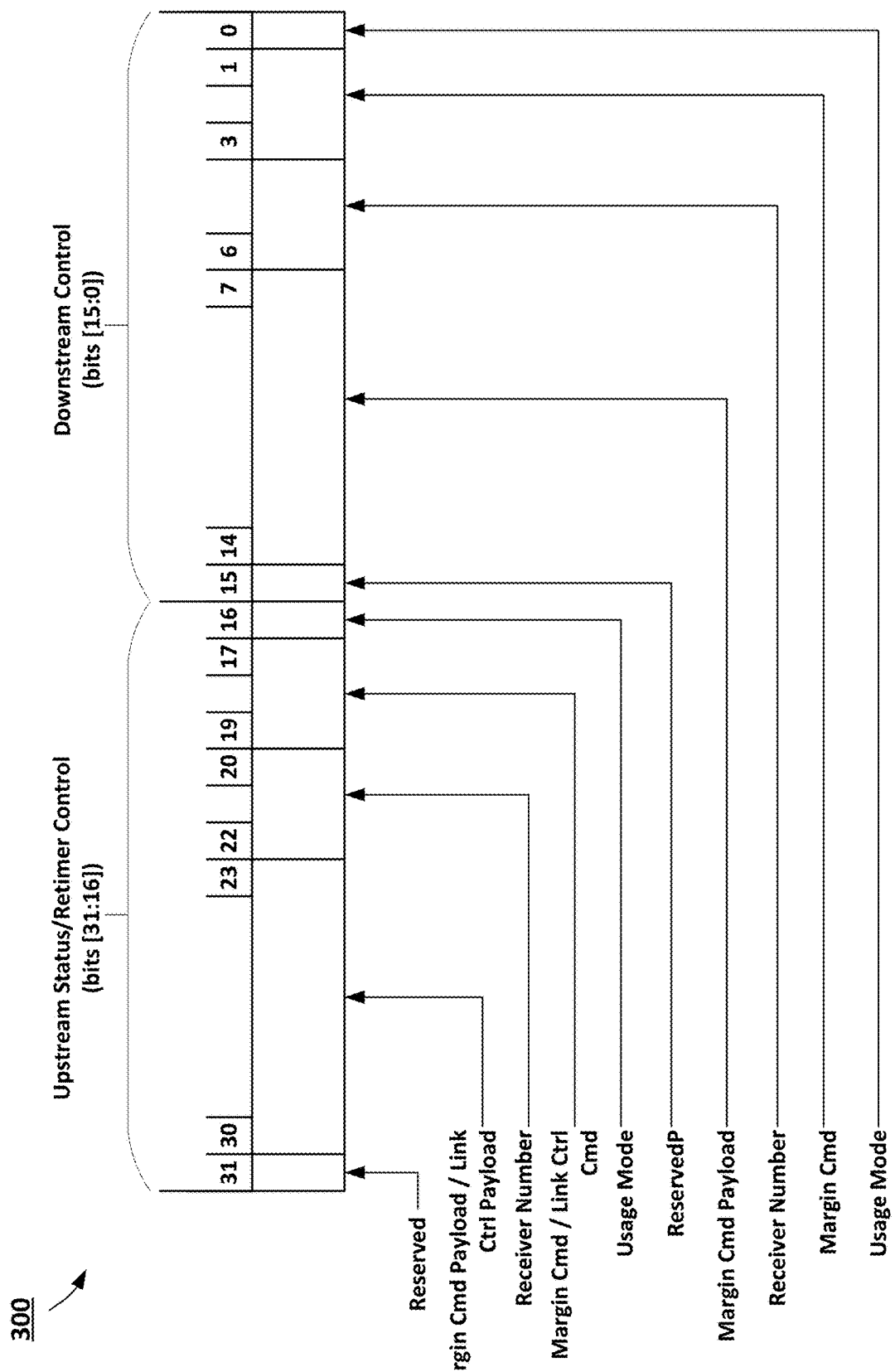
FIG. 3 is an example configuration register illustrating bit fields that can include link management information in accordance with embodiments of the present disclosure.

FIG. 3 is a schematic diagram of an example configuration register 300 that includes link management information in accordance with embodiments of the present disclosure. The configuration register 300 can include a modification to margin register fields of a margin control register to support the usage mode described herein. The configuration register 300 can be present in the downstream port as well as in the retimer(s). The register fields in the configuration register 300 are augmented to enable the usage for link control. The example configuration register 300 can be augmented to include link information, such as link control payload (e.g., in bits [30:23]) and link control commands (e.g., in bits [19:17]). Margining information can also be maintained by the configuration register 300. The configuration register 300 can also include a bit field that includes a usage mode flag (e.g., bit [16]). The usage mode flag can indicate whether a margin control usage mode is active or whether a link control usage mode is active.

Figure 4A:
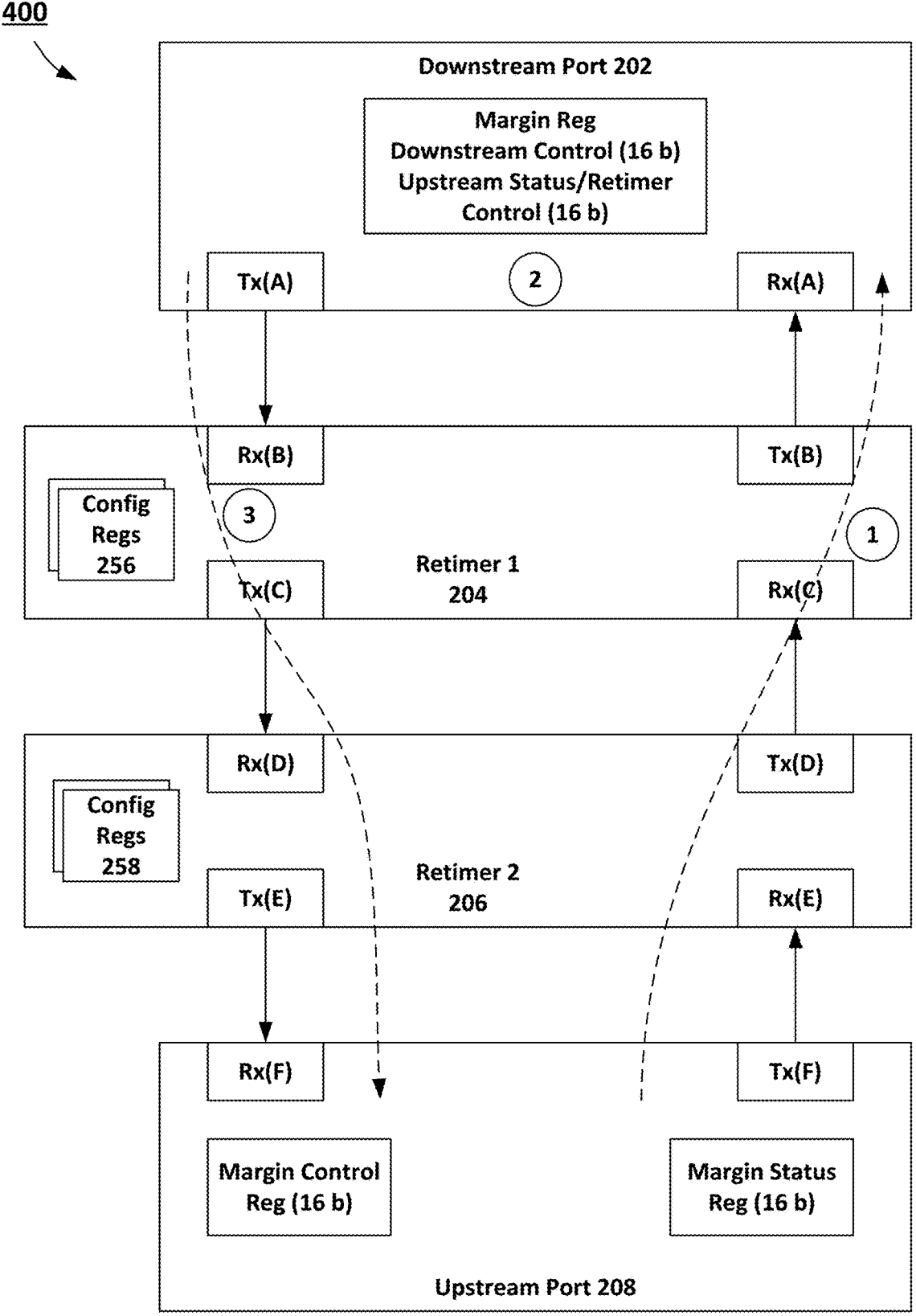
FIG. 4A is a schematic diagram of a system that includes retimers that can provide link management information in accordance with embodiments of the present disclosure.

FIG. 4A is a schematic diagram of a system that includes retimers that can provide link management information in accordance with embodiments of the present disclosure. FIG. 4 shows an example connected system 400 with two retimers, similar to that shown in FIGS. 2A-B. The connected system 400 can be a PCIe connected system, Compute Express Link (CXL) connected system, or a system using another type of interconnect protocol. Control SKP Ordered Sets have been used to perform margining as well as accessing configuration registers (256, 258) in the retimers (204, 206, respectively) along with passing proprietary vendor specific messages (which are used for low-latency discovery and enabling). Control SKP OS can be used for the link control mechanism described herein. The link control is initiated by the retimer (204, 206) as a Command (1) encoded in a Control SKP OS and the DSP 202 completes the link control command as a response (2) in a Control SKP OS. The retimer 204 can (3) receive the link control response from the DSP 202. Table 1 illustrates some of the encoding of the various link control requests from the retimer (204, 206) with the corresponding acknowledgement (ack) from the DSP.

TABLE 1

Example Encoding of Command/Response Fields in the Control SKP Ordered Set for Link Control usage

| Symbol | Description where the "Usage Model" is "Link Control" |
|---|---|
| 4 * N + 2 | Bit 6: Usage Model: (1b: Link Control)<br>(note: 0b is used for Lane Margining at Receiver) |

TABLE 1-continued

Example Encoding of Command/Response Fields in the Control SKP Ordered Set for Link Control usage

| Symbol | Description where the "Usage Model" is "Link Control" |
|---|---|
|  | Bits [5:3]: Link Control Cmd<br>    000b: Retimer Lane Control Command/DSP Retimer Lane Control Command Response<br>    001b-111b: Reserved for future usage<br>Bits [2:0]: Receiver Number of the Retimer making the Request/getting the response from the DSP<br>(Note: Unlike Margin Command, this field reflects the requestor and the response indicates the requestor for whom this response is being sent) |
| 4 * N + 3 | Bits [7:0]: Link Control Payload<br>xxxx_0001: Request Retraining/Response reflects the same value for ack<br>    Bits [7:4]: reason for retraining request:<br>        0000b—general,<br>        0001b—exceeding the operating conditions such as temp range<br>        0010b—will downshift speed for exceeding operating conditions<br>        0011b—will downshift speed for power management reasons<br>        0100b through 1111b—Reserved<br>xxxx_0010: Request Re-equalization/Response reflects the same value for ack<br>    Bits [7:4]: reason for re-eq request:<br>        0000b—general,<br>        0001b—exceeding the operating conditions such as temp range<br>        0010b through 1111b—Reserved<br>Xxxx_0011: Power management request by Retimer/Response reflects the same value for Ack<br>    Bits[7:4]: type of power management request<br>        0000b—Initiate L1<br>        0001b—Initiate dynamic link width<br>        0010b—Initiate link speed reduction<br>        0011b through 1111b—Reserved<br>xxxx_0011 through xxxx_1111: Reserve |

Figure 4B:
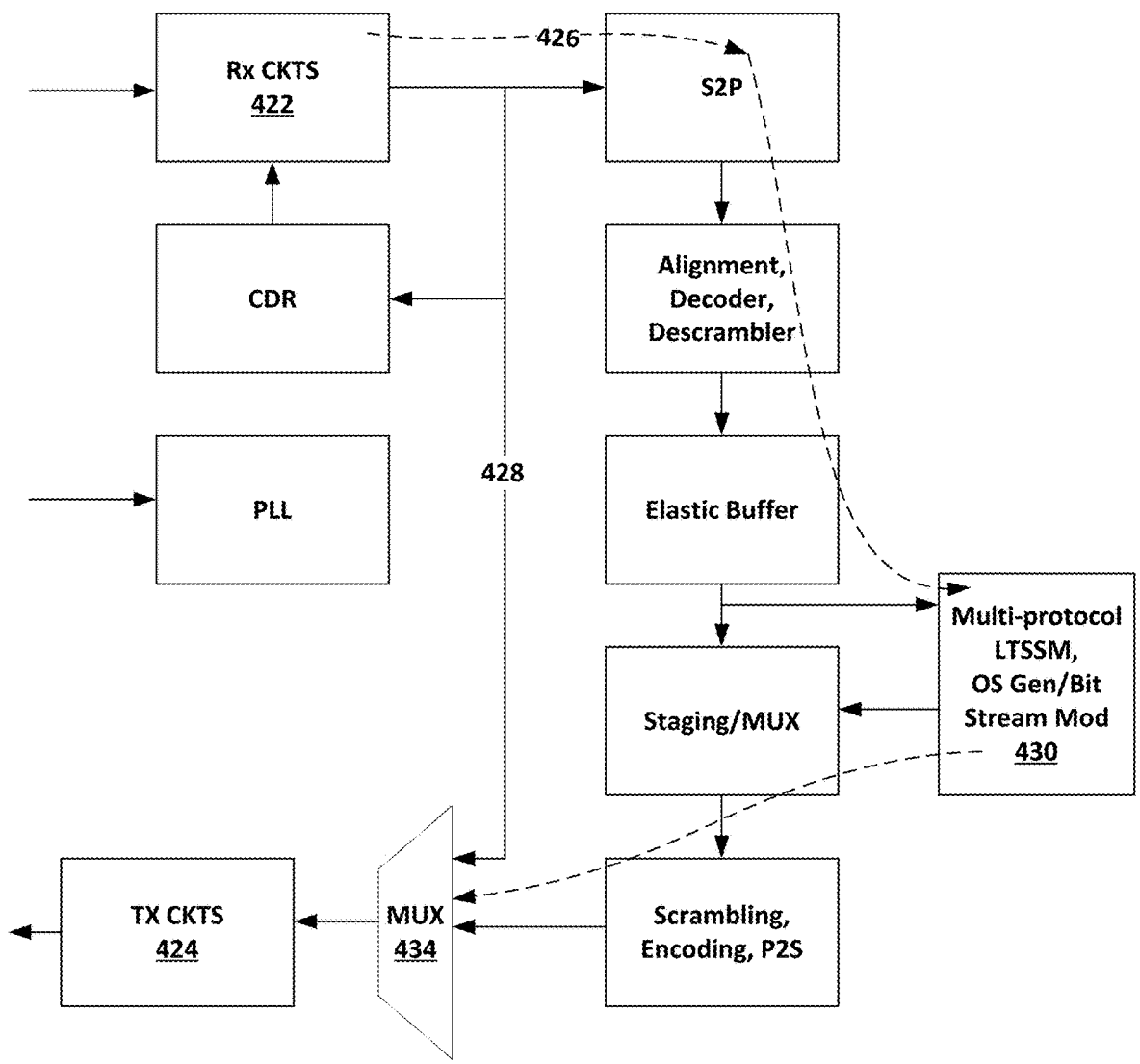
FIG. 4B is a schematic diagram of retimer logic to augment a Control SKP ordered set with link management information in accordance with embodiments of the present disclosure.

FIG. 4B is a schematic diagram of retimer logic 420 to augment a Control SKP ordered set with link management information in accordance with embodiments of the present disclosure. The retimer logic 420 can include one or more logic elements implemented in hardware circuitry, software, firmware, or a combination of hardware, software, or firmware. The logic elements 420 can include receiver circuitry 422 for receiving bits from across a link. The logic elements 420 can include various logic circuits and logic elements such as serial to parallel (S2P) logic, alignment, decoder, and descrambler logic, buffer logic, staging multiplexer, encoding logic, parallel to serial (P2S), etc. Among the logic elements 420 is an ordered set generator (OS gen) logic element 430 that can be implemented in hardware circuitry, software, firmware, or a combination of hardware, software, or firmware. The OS gen 430 can generate Control SKP OS that include link information, such as link control commands, based on a determination that the retimer is requesting a link status change. Among link status changes that the retimer can request include a request for link retraining, re-equalization, power management changes, and others.

FIG. 4B illustrates a "normal" operating mode pathway 426 and a low-latency operating mode pathway 428. The term "normal" can mean any operating mode that is not a low-latency operating mode that uses a circuit pathway similar to the low latency pathway 428 shown in FIG. 4B. In embodiments, when operating in low-latency mode, the bit stream can traverse pathway 428, and can also traverse pathway 426. MUX 434 can be controlled to select which pathway is transmitted to the transmission circuitry 424. The low-latency pathway is discussed further in the text accompanying FIGS. 4D-E and FIGS. 5A-B.

Figure 4C:
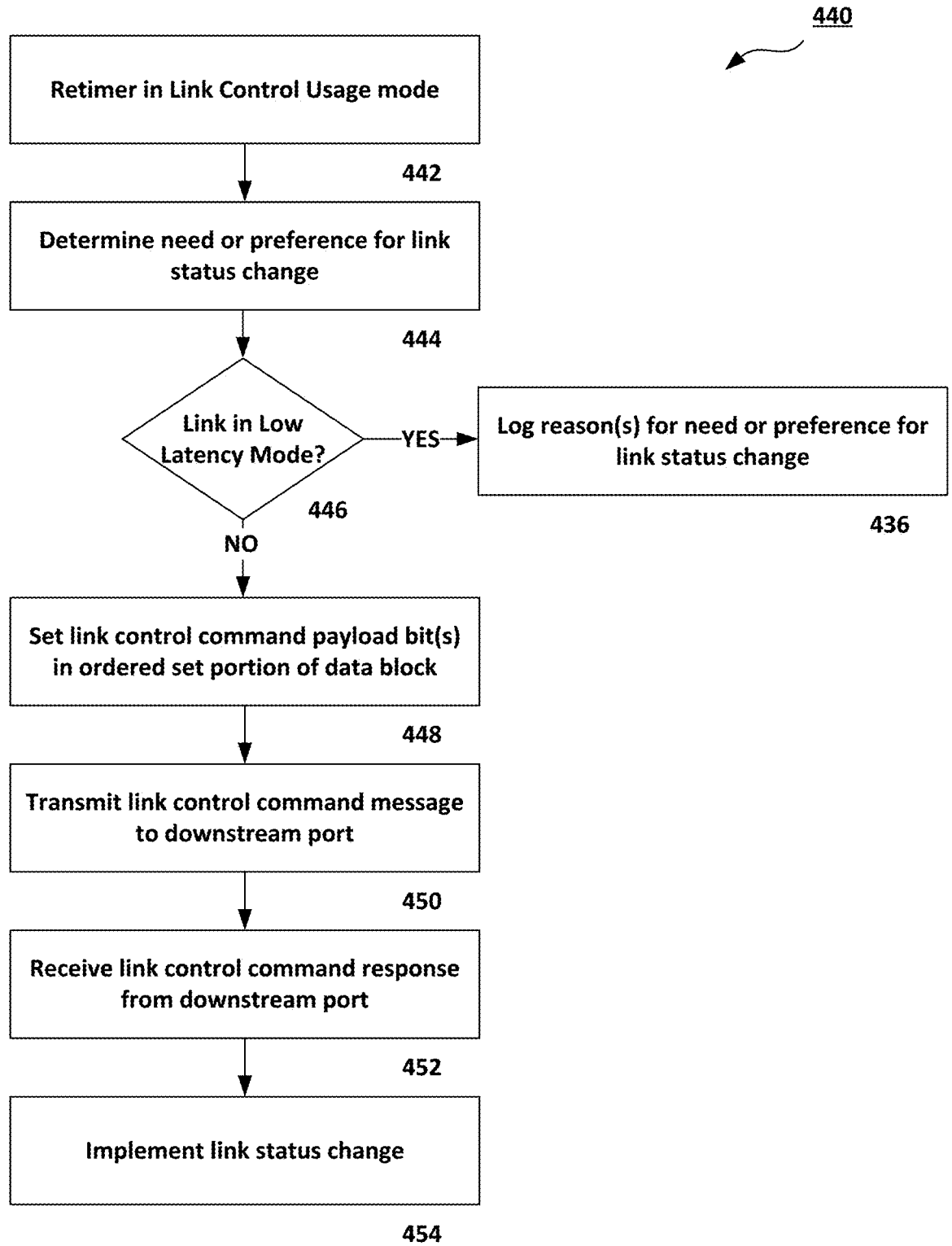
FIG. 4C is a process flow diagram for a retimer to provide link management information in accordance with embodiments of the present disclosure.

FIG. 4C is a process flow diagram for a retimer to provide link management information in accordance with embodiments of the present disclosure. When the retimer usage mode is set to provide link control in the configuration register (442), the OS gen 430 in the retimer can encode Control SKP OS with link management information (e.g., using the example encoding shown in Table 1). At the outset, a determination can be made by the retimer 204, 206 or by the DSP 202 that the link should undergo a link status change (444). For example, a determination can be made of a bit error (e.g., by a parity bit calculation), a temperature that is too high, power management changes, etc. If the link is operating in low latency mode (446), then the link can log the error or other reasons for the preference for a link status change (436).

If the link is not operating in low latency mode, then the retimer 204, 206 can use the OS generator/bit stream modifier logic element 430 to encode Control SKP OS with the appropriate link control payload (448) (e.g., by setting link control command payload bits in the Control SKP OS). The link control command payload (e.g., via the OS) can be transmitted to the downstream port (450). The retimer can receive a link control command response from the DSP (452), and based on that link control command response, the retimer can implement the link status change as appropriate (454). In some cases, the retimer would be controlled entirely by the DSP, which can cause the entire link to enter re-equalization, retraining, or enter a power management state.

Figure 4D:
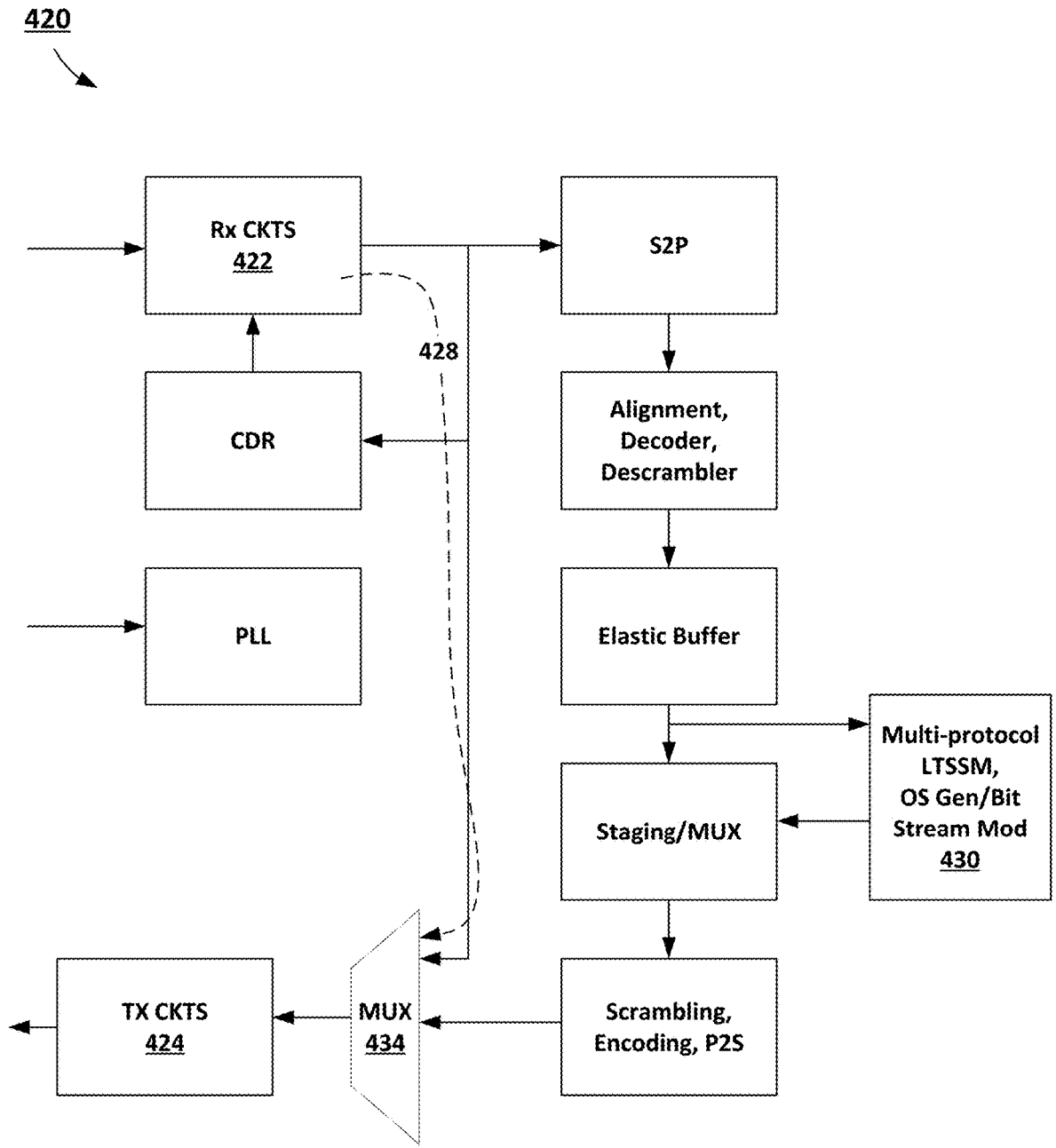
FIG. 4D is a schematic diagram of retimer logic illustrating a low latency bypass path in accordance with embodiments of the present disclosure.

FIG. 4D is a schematic diagram of retimer logic 420 illustrating a low latency bypass path 428 in accordance with embodiments of the present disclosure. While operating in low-latency retimer mode, the retimer does not manipulate parity bits. However, the retimer can store the parity error in a status register (e.g., status register 224 of FIG. 2A) that can be accessed either through sideband link or in-band at a later point of time when the retimer is put in normal mode. This status register can be read-only, write 1 to clear (RW1C).

However, since the in-band configuration access mechanism has a read command, the clear can be made effective when the downstream Control SKP OS accessing the configuration register switches over to a different margin command (such as NO Command). The change in margin command can be interpreted as a write 1 clear for the parity bit error stored in the status register.

Figure 4E:
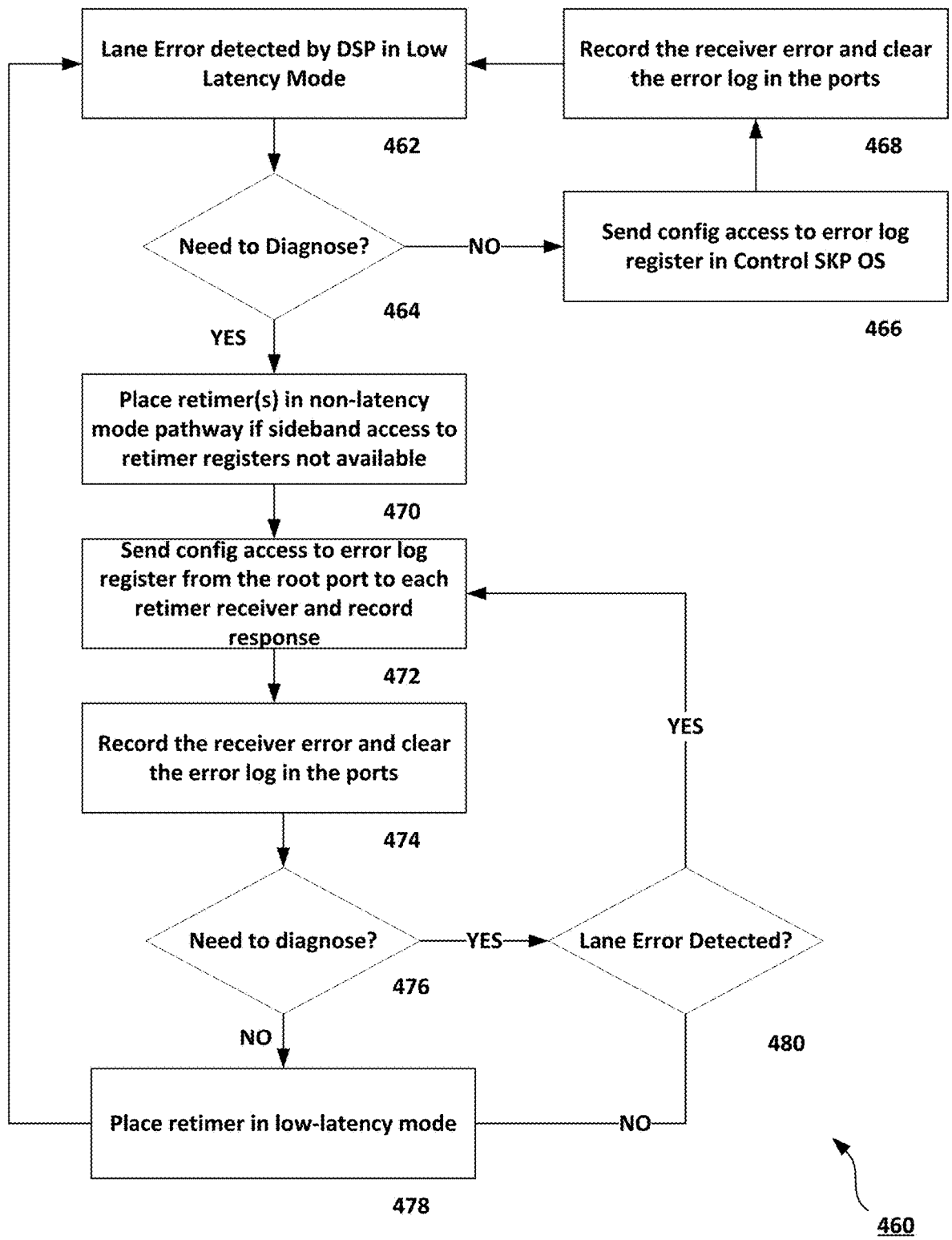
FIG. 4E is a process flow diagram for logging parity bit errors for a link in low latency mode in accordance with embodiments of the present disclosure.

FIG. 4E is a process flow diagram 460 for logging parity bit errors for a link in low latency mode in accordance with embodiments of the present disclosure. Process flow chart 460 illustrates how the error location information can be obtained even when operating the retimers in the low-latency mode by accessing the error log registers in the configuration space of the retimers. If the configuration space of the retimer is accessible through a sideband mechanism, such as SMBus or JTAG, then the error reporting occurs via the sideband link. If the parity errors are accessed through the in-band Control SKP OS mechanism, process flow 460 describes the steps that can be used to facilitate the access by switching over to the normal mode from the low-latency mode and then switching back to the low-latency mode.

At the outset, a lane error can be detected while the link (and retimer) is in a low latency mode (462). The lane error can be detected, for example, by the downstream port (DSP) 202. The lane error can be a bit error that is calculated by a parity bit calculation, for example, or other type of lane error.

A determination can be made whether a diagnosis of the lane error is to be performed (464). For example, a diagnosis of the link segment or receiver that first encountered the error can be performed. If no diagnosis is to be performed, then the DSP can transmit a configuration access to the error log register (or status register) in a Control SKP OS to each of the retimer receivers (e.g., receiver circuit 422) (466). For example, the Control SKP OS sent to the retimer receivers can be sent for 100 ⌷ s. No response is expected by the DSP other than No Command, which can clear the error log register in the retimer(s). The error log registers can also be cleared by a sideband mechanism (468).

If a diagnosis of the link segment or the receiver that first encountered the error is to be performed, then the DSP can place the retimer(s) into the non-low-latency mode (or normal mode) of operation (470). For example, the retimer circuitry can be switched to transmit bit streams through the pathway 426 shown in FIG. 4B (assuming no sideband access to the retimer registers is available). The DSP can send a configuration access to the error log register from the DSP root port to each of the retimer receivers (472). For example, a configuration access can be sent using a Control SKP OS with a No Command in between each configuration access. The DSP can then record the response received from the retimer(s). The DSP can then record the receiver error and clear the error log in the ports (474).

Since the link and retimers are in normal mode, the DSP can determine whether it is to diagnose the link segment and/or receivers that first encountered the errors prior to returning to low-latency mode (476). If a diagnosis is to be performed on the link segment or receiver, and if a lane error is detected, the process can return to (472) to record errors. If no diagnosis is to be performed or if no errors are detected on the lane, then the DSP can return the link, link segment, and/or retimer to low-latency mode (478). The process can begin again at (462).

Figure 5A:
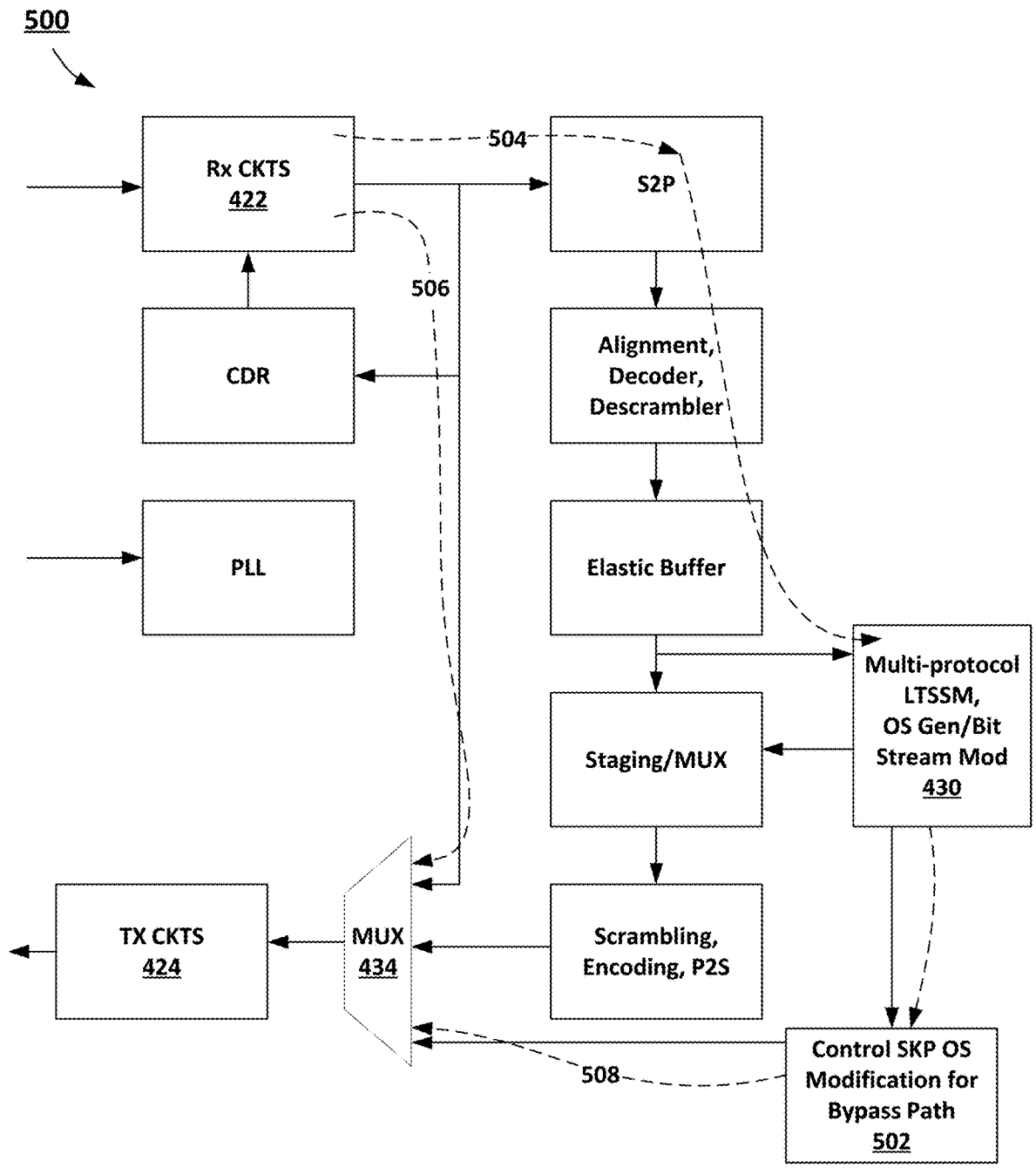
FIG. 5A is a schematic diagram of retimer logic illustrating a low latency bypass path for links that use fixed intervals for Control SKP ordered sets in accordance with embodiments of the present disclosure.

FIG. 5A is a schematic diagram of retimer logic 500 illustrating a low latency bypass path for links that use fixed intervals for Control SKP ordered sets in accordance with embodiments of the present disclosure. The retimer logic 500 is similar to retimer logic 420 shown in FIGS. 4B and 4D, and includes circuitry and software/firmware logic to modify the Control SKP OS for the bypass path (referred to as modification logic 502). In some embodiments, the link can use a fixed interval for scheduling Control SKP OS. For example, CXL links and some PCIe links use such predetermined scheduling for Control SKP OS transmission. The Control SKP OS are scheduled to arrive at a fixed interval (e.g., 340th data block, scheduled timing, etc.). A retimer in low-latency mode can add the link management information into a Control SKP OS using the modification logic 502. The retimer can use the known scheduling intervals for Control SKP OS transmissions to add link management information to Control SKP OS by having the appropriate link management information (or even link control request if needed) bits prepared prior to the scheduled Control SKP OS transmission. The retimer can set the MUX 434 to flip to the "Bypass path Control SKP OS override" path 508 from the "Bypass path for low latency" path 506 during the period of time for transmission of the Control SKP OS bits and switching back to the "Bypass path for low latency" 506 after the Control SKP OS transmission interval is completed. Noteworthy is that in embodiments, even in low-latency mode, the bit stream can traverse the normal pathway 504, so that the Control SKP OS bits can be modified and injected into the bit stream at the scheduled timing.

Figure 5B:
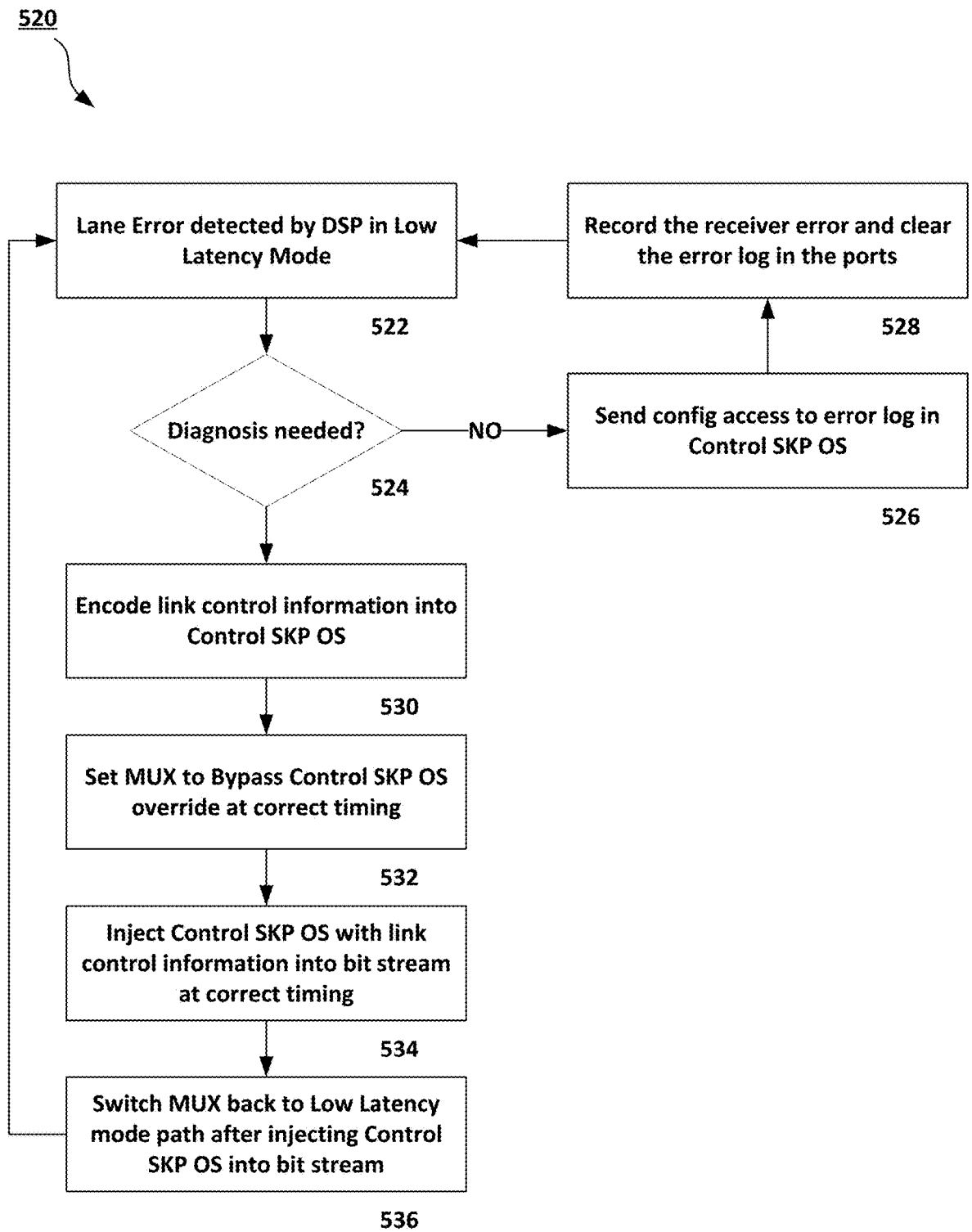
FIG. 5B is a process flow diagram for a retimer to provide augment Control SKP ordered sets with link management information in low latency operating modes in accordance with embodiments of the present disclosure.

FIG. 5B is a process flow diagram 520 for a retimer to provide augment Control SKP ordered sets with link management information in low latency operating modes in accordance with embodiments of the present disclosure. At the outset, a lane error can be detected while the link (and retimer) is in a low latency mode (522). The lane error can be detected, for example, by the downstream port (DSP) 202. The lane error can be a bit error that is calculated by a parity bit calculation, for example, or other type of lane error.

A determination can be made whether a diagnosis of the lane error is to be performed (524). For example, a diagnosis of the link segment or receiver that first encountered the error can be performed. If no diagnosis is to be performed, then the DSP can transmit a configuration access to the error log register (or status register) in a Control SKP OS to each of the retimer receivers (e.g., receiver circuit 422) (526). For example, the Control SKP OS sent to the retimer receivers can be sent for 100 ⌷ s. No response is expected by the DSP other than No Command, which can clear the error log register in the retimer(s). The error log registers can also be cleared by a sideband mechanism (528).

If a diagnosis of the link segment or the receiver that first encountered the error is to be performed, then the bit stream that traverses the logic circuitry through the non-low-latency pathway can be augmented with Control SKP OS data blocks that include link control information bits or retimer response bits (530).

The retimer can set a MUX to switch from the low-latency pathway for bit stream transmission to a bypass pathway for transmitting the Control SKP OS at a predetermined interval (532). Retimer can inject the Control SKP OS into the bit stream at the predetermined interval such that the Control SKP OS that is transmitted include the link management information (534). The retimer can then switch the MUX back to the low-latency pathway after the expiration of the predetermined Control SKP OS transmission interval.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 6:
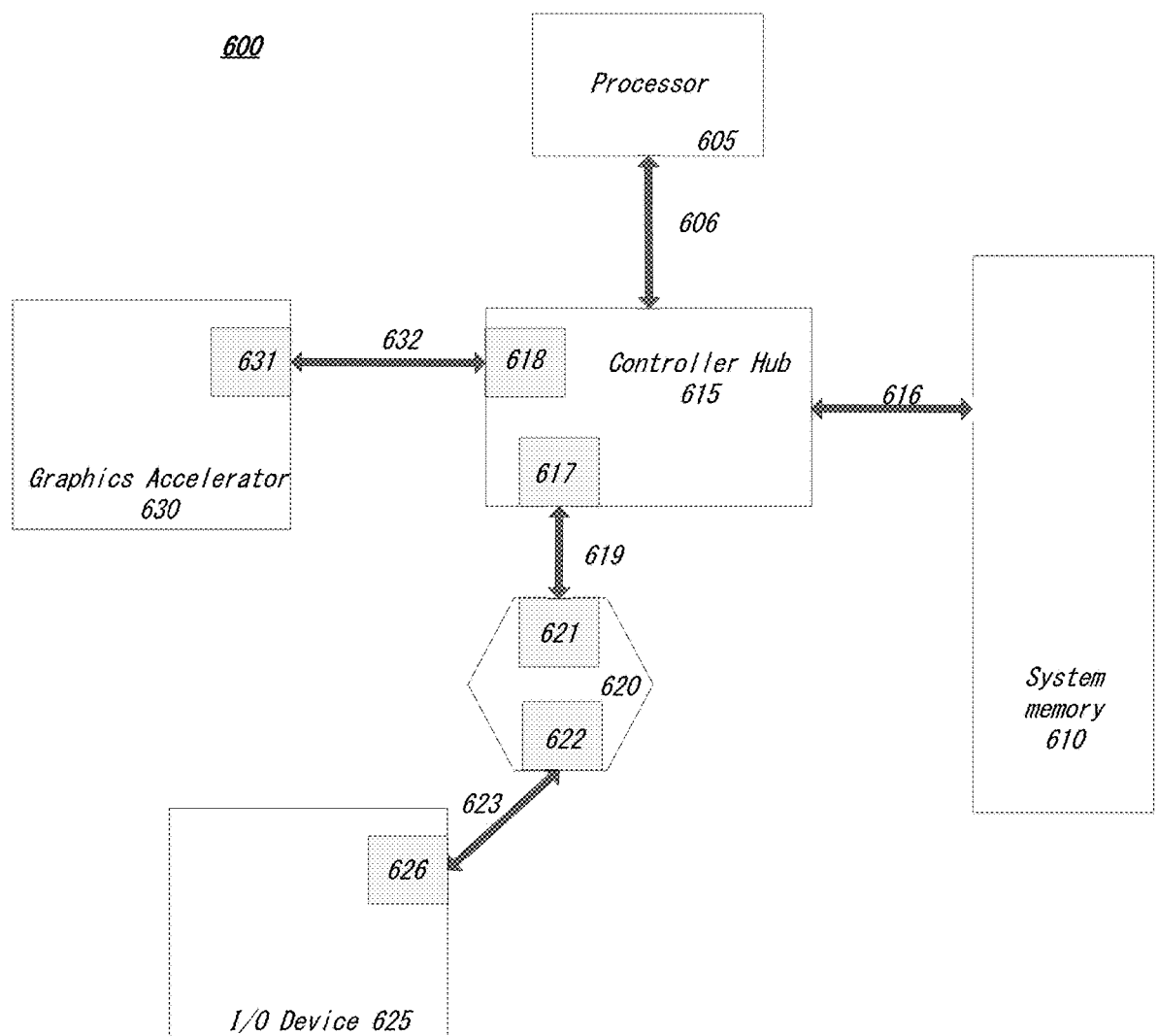
FIG. 6 illustrates an embodiment of a computing system including an interconnect architecture.

Referring to FIG. 6, an embodiment of a fabric composed of point-to-point Links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe or PCIE) interconnection hierarchy. Examples of controller hub 615 include a chipset, a memory controller hub (MCH), a northbridge, an interconnect controller hub (ICH) a southbridge, and a root port controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root port controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
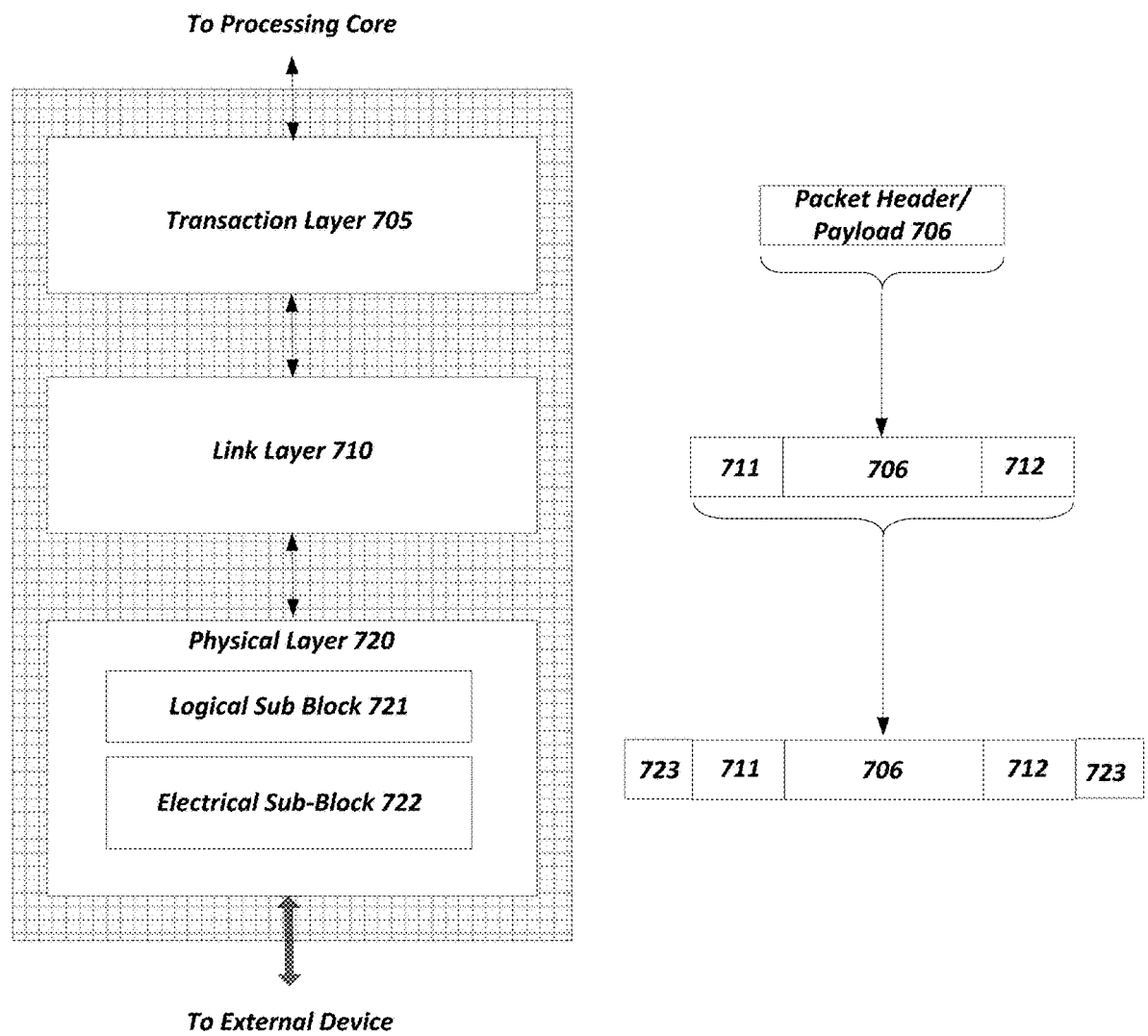
FIG. 7 illustrates an embodiment of an interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCIe stack, a next generation high performance computing interconnect stack, or other layered stack. Although the discussion immediately below in reference to FIGS. 6-9 are in relation to a PCIe stack, the same concepts may be applied to other interconnect stacks. In one embodiment, protocol stack 700 is a PCIe protocol stack including transaction layer 705, link layer 710, and physical layer 720. An interface, such as interfaces 617, 618, 621, 622, 626, and 631 in FIG. 1, may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
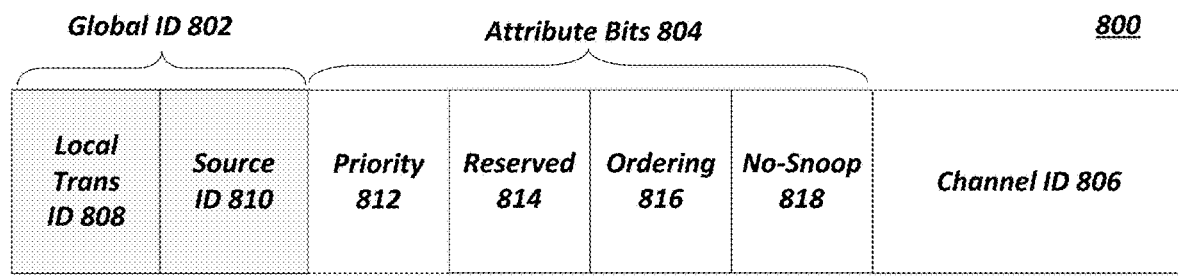
FIG. 8 illustrates an embodiment of a request or packet to be generated or received within an interconnect architecture.

Quickly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 804, and channel identifier field 806. In the illustrated example, global identifier field 802 is depicted comprising local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction. Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Link layer 710, also referred to as data link layer 710, acts as an intermediate stage between transaction layer 705 and the physical layer 720. In one embodiment, a responsibility of the data link layer 710 is providing a reliable mechanism for exchanging Transaction Layer Packets (TLPs) between two components a link. One side of the Data Link Layer 710 accepts TLPs assembled by the Transaction Layer 705, applies packet sequence identifier 711, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 710.

Physical block 722 includes a transmitter and a receiver. The transmitter is supplied by logical sub-block 721 with symbols, which the transmitter serializes and transmits onto to an external device. The receiver is supplied with serialized symbols from an external device and transforms the received signals into a bit-stream. The bit-stream is de-serialized and supplied to logical sub-block 721. In one embodiment, an 8b/10b transmission code is employed, where ten-bit symbols are transmitted/received. Here, special symbols are used to frame a packet with frames 723. In addition, in one example, the receiver also provides a symbol clock recovered from the incoming serial stream.

As stated above, although transaction layer 705, link layer 710, and physical layer 720 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 9:
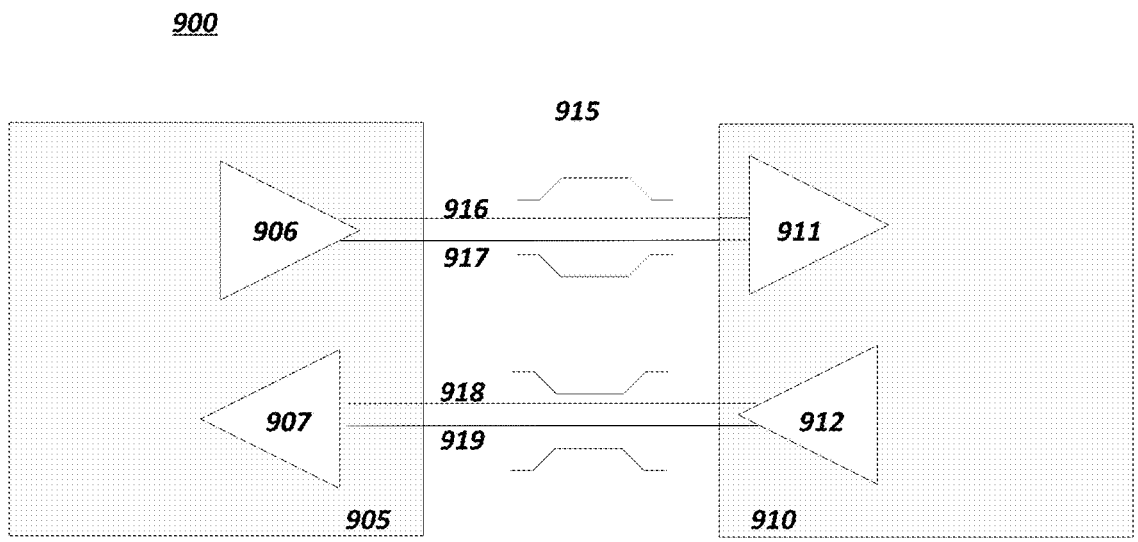
FIG. 9 illustrates an embodiment of a transmitter and receiver pair for an interconnect architecture.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 915. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 916 and 917, to transmit differential signals. As an example, when line 916 toggles from a low voltage level to a high voltage level, i.e. a rising edge, line 917 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Note that the apparatus, methods, and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 10:
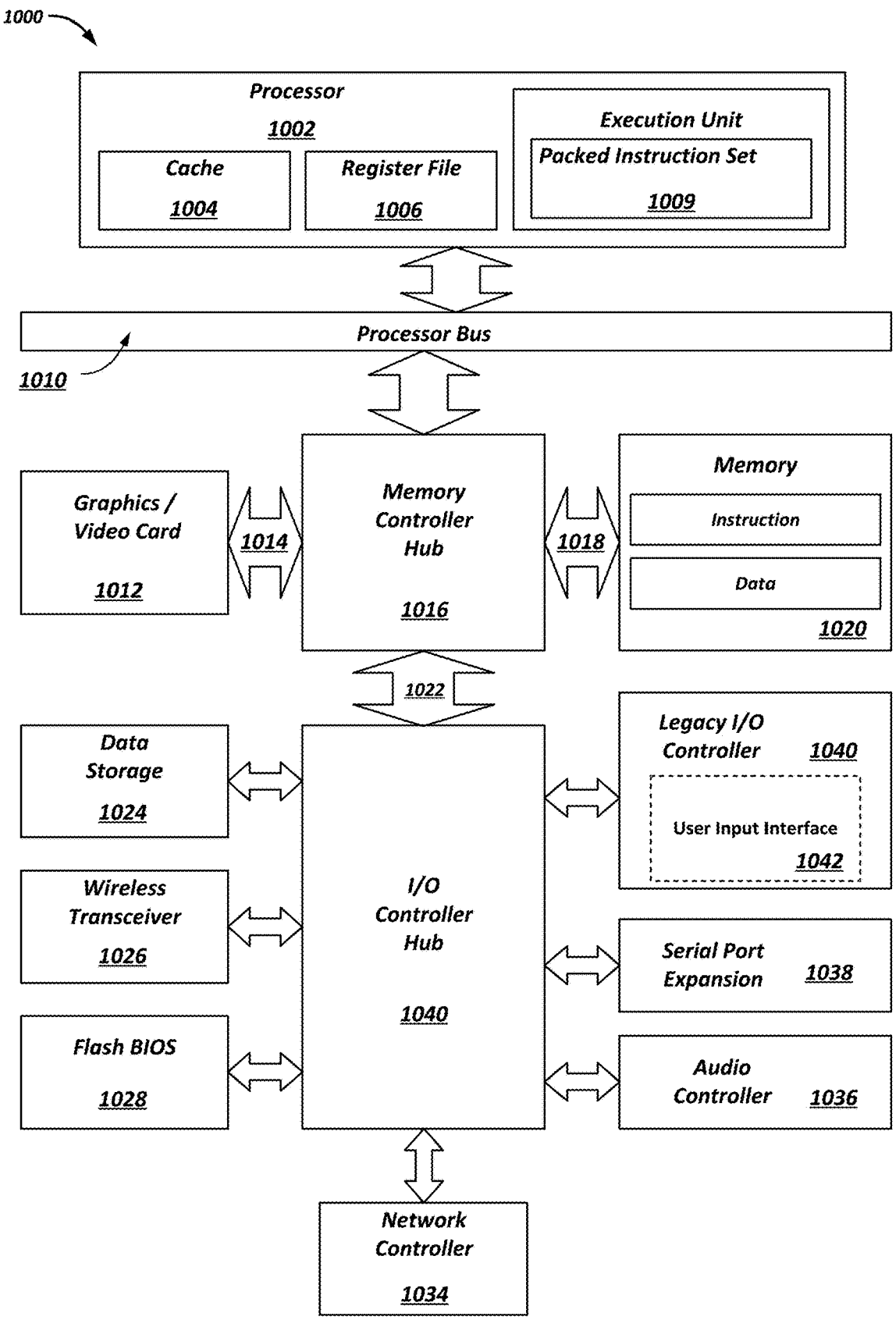
FIG. 10 illustrates another embodiment of a block diagram for a computing system including a processor.

Turning to FIG. 10, a block diagram of an exemplary computer system formed with a processor that includes execution units to execute an instruction, where one or more of the interconnects implement one or more features in accordance with one embodiment of the present disclosure is illustrated. System 1000 includes a component, such as a processor 1002 to employ execution units including logic to perform algorithms for process data, in accordance with the present disclosure, such as in the embodiment described herein. System 1000 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1000 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1002 includes one or more execution units 1008 to implement an algorithm that is to perform at least one instruction. One embodiment may be described in the context of a single processor desktop or server system, but alternative embodiments may be included in a multiprocessor system. System 1000 is an example of a 'hub' system architecture. The computer system 1000 includes a processor 1002 to process data signals. The processor 1002, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1002 is coupled to a processor bus 1010 that transmits data signals between the processor 1002 and other components in the system 1000. The elements of system 1000 (e.g. graphics accelerator 1012, memory controller hub 1016, memory 1020, I/O controller hub 1024, wireless transceiver 1026, Flash BIOS 1028, Network controller 1034, Audio controller 1036, Serial expansion port 1038, I/O controller 1040, etc.) perform their conventional functions that are well known to those familiar with the art.

In one embodiment, the processor 1002 includes a Level 1 (L1) internal cache memory 1004. Depending on the architecture, the processor 1002 may have a single internal cache or multiple levels of internal caches. Other embodiments include a combination of both internal and external caches depending on the particular implementation and needs. Register file 1006 is to store different types of data in various registers including integer registers, floating point registers, vector registers, banked registers, shadow registers, checkpoint registers, status registers, and instruction pointer register.

Execution unit 1008, including logic to perform integer and floating point operations, also resides in the processor 1002. The processor 1002, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1002. For one embodiment, execution unit 1008 includes logic to handle a packed instruction set 1009. By including the packed instruction set 1009 in the instruction set of a general-purpose processor 1002, along with associated circuitry to execute the instructions, the operations used by many multimedia applications may be performed using packed data in a general-purpose processor 1002. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1008 may also be used in micro controllers, embedded processors, graphics devices, DSPs, and other types of logic circuits. System 1000 includes a memory 1020. Memory 1020 includes a dynamic random access memory (DRAM) device, a static random access memory (SRAM) device, flash memory device, or other memory device. Memory 1020 stores instructions and/or data represented by data signals that are to be executed by the processor 1002.

Note that any of the aforementioned features or aspects of the disclosure may be utilized on one or more interconnect illustrated in FIG. 10. For example, an on-die interconnect (ODI), which is not shown, for coupling internal units of processor 1002 implements one or more aspects of the disclosure described above. Or the disclosure is associated with a processor bus 1010 (e.g. Intel Quick Path Interconnect (QPI) or other known high performance computing interconnect), a high bandwidth memory path 1018 to memory 1020, a point-to-point link to graphics accelerator 1012 (e.g. a Peripheral Component Interconnect express (PCIe) compliant fabric), a controller hub interconnect 1022, an I/O or other interconnect (e.g. USB, PCI, PCIe) for coupling the other illustrated components. Some examples of such components include the audio controller 1036, firmware hub (flash BIOS) 1028, wireless transceiver 1026, data storage 1024, legacy I/O controller 1010 containing user input and keyboard interfaces 1042, a serial expansion port 1038 such as Universal Serial Bus (USB), and a network controller 1034. The data storage device 1024 can comprise a hard disk drive, a floppy disk drive, a CD-ROM device, a flash memory device, or other mass storage device.

Figure 11:
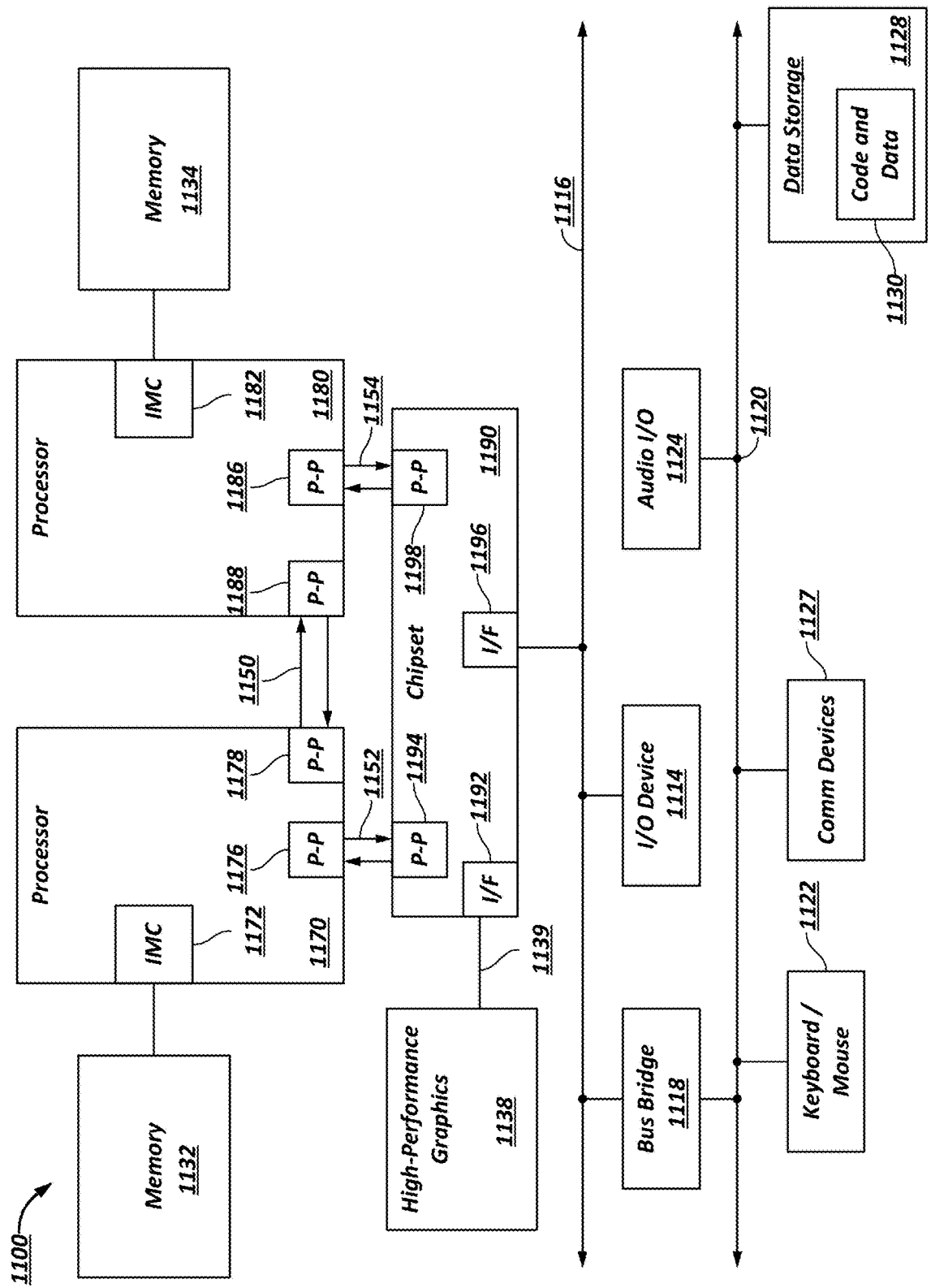
FIG. 11 illustrates an embodiment of a block for a computing system including multiple processor sockets.

Referring now to FIG. 11, shown is a block diagram of a second system 1100 in accordance with an embodiment of the present disclosure. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of a processor. In one embodiment, 1152 and 1154 are part of a serial, point-to-point coherent interconnect fabric, such as Intel's Quick Path Interconnect (QPI) architecture. As a result, the disclosure may be implemented within the QPI architecture.

While shown with only two processors 1170, 1180, it is to be understood that the scope of the present disclosure is not so limited. In other embodiments, one or more additional processors may be present in a given processor.

Processors 1170 and 1180 are shown including integrated memory controller units 1172 and 1182, respectively. Processor 1170 also includes as part of its bus controller units point-to-point (P-P) interfaces 1176 and 1178; similarly, second processor 1180 includes P-P interfaces 1186 and 1188. Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 each exchange information with a chipset 1190 via individual P-P interfaces 1152, 1154 using point to point interface circuits 1176, 1194, 1186, 1198. Chipset 1190 also exchanges information with a high-performance graphics circuit 1138 via an interface circuit 1192 along a high-performance graphics interconnect 1139.

A shared cache (not shown) may be included in either processor or outside of both processors; yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present disclosure is not so limited.

As shown in FIG. 11, various I/O devices 1114 are coupled to first bus 1116, along with a bus bridge 1118 which couples first bus 1116 to a second bus 1120. In one embodiment, second bus 1120 includes a low pin count (LPC) bus. Various devices are coupled to second bus 1120 including, for example, a keyboard and/or mouse 1122, communication devices 1127 and a storage unit 1128 such as a disk drive or other mass storage device which often includes instructions/ code and data 1130, in one embodiment. Further, an audio I/O 1124 is shown coupled to second bus 1120. Note that other architectures are possible, where the included components and interconnect architectures vary. For example, instead of the point-to-point architecture of FIG. 11, a system may implement a multi-drop bus or other such architecture.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Example 1 is an apparatus comprising a receiver circuit implemented at least partially in hardware; a configuration register comprising a link management bit set, and one or more bit fields for link management bits indicating link management information; bit stream logic implemented at least partially in hardware to encode an ordered set (OS) with one or more link management bits from the configuration register; and a transmitter circuit implemented at least partially in hardware to transmit OS with the one or more link management bits across a link.

Example 2 may include the subject matter of example 1, wherein the link is an in-band link that couples the apparatus to a downstream port of an upstream connected device.

Example 3 may include the subject matter of any of examples 1-2, wherein the link is compliant with a Peripheral Component Interconnect Express (PCIe) based protocol or an CXL protocol.

Example 4 may include the subject matter of any of examples 1-3, wherein apparatus comprises a retimer coupled to a downstream port of an upstream connected device.

Example 5 may include the subject matter of any of examples 1-4, further comprising a multiplexer (MUX) circuit to selectively output bits from a first data pathway or a second data pathway, the first data pathway comprising the bit stream logic and the second data pathway absent the bit stream logic, the second data pathway comprising a low-latency pathway.

Example 6 may include the subject matter of example 5, wherein the retimer, when the MUX is set to the second pathway, is to log a bit stream error in an error log register.

Example 7 may include the subject matter of example 6, wherein the retimer is to set the MUX to the first pathway from the second pathway to retrieve the bit stream error from the error log register when a sideband link to a downstream port of an upstream connected device is not available.

Example 8 may include the subject matter of example 6, wherein the retimer is to clear the error log register upon receiving a margin command.

Example 9 may include the subject matter of example 1, further comprising a link that operates using a scheduled interval for transmitting OS; OS modification circuitry to create modified OS data blocks with link management information; and a multiplexer (MUX) circuit comprising a single output and a first input for a low-latency pathway and a second input for a for OS data blocks. The apparatus is to set the MUX from the first input to the second input at the scheduled interval to inject the modified OS data blocks into the bit stream and to set the MUX from the second input to the first input after the scheduled interval.

Example 10 may include the subject matter of any of examples 1-9, wherein the OS comprises a control skip ordered set (Control SKP OS).

Example 11 is a method comprising detecting an error in a bit stream at a retimer; encoding a control skip ordered set (Control SKP OS) with link management information based on the error detected in the bit stream; and transmitting the Control SKP OS to a downstream port of an upstream connected device across an in-band link.

Example 12 may include the subject matter of example 11, further comprising identifying a source of the error in the bit stream; identifying one or more link management bits from a configuration register indicating a requested link action; and encoding the Control SKP OS with the one or more link management bits.

Example 13 may include the subject matter of example 12, further comprising identifying one or more link information bits from the configuration register indicating a reason for the request link action; and encoding the Control SKP OS with the one or more link information bits.

Example 14 may include the subject matter of example 11, further comprising setting the in-band link to a low-latency mode; determining a presence of an error on the in-band link; and storing the error in an error log register associated with the retimer.

Example 15 may include the subject matter of example 14, further comprising setting the in-band link to a non-low-latency mode; retrieving the error from the error log register using the in-band link; and clearing the error log register.

Example 16 may include the subject matter of example 11, further comprising setting a multiplexer at the retimer to a low-latency mode of operation; determining an error in the in-band link, the in-band link configured to transmit Control SKP OS at a predetermined interval; encoding Control SKP OS with link management information based on the determined error in the in-band link; setting the multiplexer to a bypass input at the start of the predetermined interval; transmitting the Control SKP OS into the bit stream; and setting the multiplexer to the low-latency mode of operation after the predetermined interval.

Example 17 is a non-transitory computer-readable media comprising instructions to cause an apparatus, upon execution of the instructions by one or more processors of the apparatus, to detect an error in a bit stream at a retimer; encode a control skip ordered set (Control SKP OS) with link management information based on the error detected in the bit stream; and transmit the Control SKP OS to a downstream port of an upstream connected device across an in-band link.

Example 18 may include the subject matter of example 17, the instructions to cause the apparatus to identify a source of the error in the bit stream; identify one or more link management bits from a configuration register indicating a requested link action; and encode the Control SKP OS with the one or more link management bits.

Example 19 may include the subject matter of example 18, the instructions to cause the apparatus to identify one or more link information bits from the configuration register indicating a reason for the request link action; and encode the Control SKP OS with the one or more link information bits.

Example 20 may include the subject matter of example 17, the instructions to cause the apparatus to set the in-band link to a low-latency mode; determine a presence of an error on the in-band link; and store the error in an error log register associated with the retimer.

Example 21 may include the subject matter of example 20, the instructions to cause the apparatus to set the in-band link to a non-low-latency mode; retrieve the error from the error log register using the in-band link; and clear the error log register.

Example 22 may include the subject matter of example 17, the instructions to cause the apparatus to set a multiplexer at the retimer to a low-latency mode of operation; determine an error in the in-band link, the in-band link configured to transmit Control SKP OS at a predetermined interval; encode Control SKP OS with link management information based on the determined error in the in-band link; set the multiplexer to a bypass input at the start of the predetermined interval; transmit the Control SKP OS into the bit stream; and set the multiplexer to the low-latency mode of operation after the predetermined interval.

Example 23 is a system comprising an upstream device comprising a downstream port; a retimer comprising a configuration register comprising a link management bit set, and one or more bit fields for link management bits indicating link management information; bit stream logic implemented at least partially in hardware to encode an ordered set (OS) with one or more link management bits from the configuration register; and a multi-lane link coupling the downstream port with the retimer. The retimer is to detect an error in a bit stream at a retimer; encode a control skip ordered set (Control SKP OS) with link management information based on the error detected in the bit stream; and transmit the Control SKP OS to the downstream port across the multi-lane link.

Example 24 may include the subject matter of example 23, the system including a error log register at the retimer, the retimer to set the in-band link to a low-latency mode; determine a presence of an error on the in-band link; store the error in an error log register associated with the retimer; set the in-band link to a non-low-latency mode; retrieve the error from the error log register using the in-band link; and clear the error log register.

Example 25 may include the subject matter of example 23, the system including a multiplexer, the retimer to set a multiplexer at the retimer to a low-latency mode of operation; determine an error in the in-band link, the in-band link configured to transmit Control SKP OS at a predetermined interval; encode Control SKP OS with link management information based on the determined error in the in-band link; set the multiplexer to a bypass input at the start of the predetermined interval; transmit the Control SKP OS into the bit stream; and set the multiplexer to the low-latency mode of operation after the predetermined interval.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus comprising:
   a receiver circuit implemented at least partially in hardware;
   a configuration register comprising a link management bit set, and one or more bit fields for link management bits indicating a link management command;
   bit stream logic implemented at least partially in hardware to encode an ordered set (OS) with one or more link management bits from the configuration register, wherein the OS comprises a control skip ordered set (Control SKP OS); and
   a transmitter circuit implemented at least partially in hardware to transmit the OS with the one or more link management bits across a link.

2. The apparatus of claim 1, wherein the link is an in-band link that couples the apparatus to a downstream port of an upstream connected device.

3. The apparatus of claim 1, wherein the link is compliant with a Peripheral Component Interconnect Express (PCIe) based protocol.

4. The apparatus of claim 1, wherein the apparatus comprises a retimer coupled to a downstream port of an upstream connected device.

5. The apparatus of claim 1, further comprising a multiplexer (MUX) circuit to selectively output bits from a first data pathway or a second data pathway, the first data pathway comprising the bit stream logic and the second data pathway absent the bit stream logic, the second data pathway comprising a low-latency pathway.

6. The apparatus of claim 5, wherein the apparatus comprises a retimer, the retimer, when the MUX is set to the second data pathway, is to log a bit stream error in an error log register.

7. The apparatus of claim 6, wherein the retimer is to set the MUX to the first data pathway from the second data pathway to retrieve the bit stream error from the error log register when a sideband link to a downstream port of an upstream connected device is not available.

8. The apparatus of claim 6, wherein the retimer is to clear the error log register upon receiving a margin command.

9. The apparatus of claim 1, further comprising:
   a link that operates using a scheduled interval for transmitting ordered sets;
   OS modification circuitry to create modified OS data blocks with link management information; and
   a multiplexer (MUX) circuit comprising a single output and a first input for a low-latency pathway and a second input for OS data blocks,
   the apparatus to set the MUX from the first input to the second input at the scheduled interval to inject the modified OS data blocks into a bit stream and to set the MUX from the second input to the first input after the scheduled interval.

10. A method comprising:
    detecting an error in a bit stream at a retimer;
    encoding a control skip ordered set (Control SKP OS) with link management information based on the error detected in the bit stream;
    transmitting the Control SKP OS to a downstream port of an upstream connected device across an in-band link;
    identifying a source of the error in the bit stream;
    identifying one or more link management bits from a configuration register indicating a requested link action; and
    encoding the Control SKP OS with the one or more link management bits.

11. The method of claim 10, further comprising:
identifying one or more link information bits from the configuration register indicating a reason for the request link action; and
encoding the Control SKP OS with the one or more link information bits.

12. The method of claim 10, further comprising:
setting the in-band link to a low-latency mode;
determining a presence of an error on the in-band link; and
storing the error on the in-band link in an error log register associated with the retimer.

13. The method of claim 12, further comprising:
setting the in-band link to a non-low-latency mode;
retrieving the error on the in-band link from the error log register using the in-band link; and
clearing the error log register.

14. The method of claim 10, further comprising:
setting a multiplexer at the retimer to a low-latency mode of operation;
determining an error in the in-band link, the in-band link configured to transmit the Control SKP OS at a predetermined interval;
encoding the Control SKP OS with link management information based on the determined error in the in-band link;
setting the multiplexer to a bypass input at the start of the predetermined interval;
transmitting the Control SKP OS into the bit stream; and
setting the multiplexer to the low-latency mode of operation after the predetermined interval.

15. One or more non-transitory computer-readable media comprising instructions to cause an apparatus, upon execution of the instructions by one or more processors of the apparatus, to:
detect an error in a bit stream at a retimer;
identify a source of the error in the bit stream;
identify one or more link management bits from a configuration register indicating a requested link action;
encode a control skip ordered set (Control SKP OS) with a link management command based on the error detected in the bit stream;
encode the Control SKP OS with the one or more link management bits; and
transmit the Control SKP OS to a downstream port of an upstream connected device across an in-band link.

16. The one or more non-transitory computer-readable media of claim 15, the instructions to cause the apparatus to:
identify one or more link information bits from the configuration register indicating a reason for the request link action; and
encode the Control SKP OS with the one or more link information bits.

17. The one or more non-transitory computer-readable media of claim 15, the instructions to cause the apparatus to:
set the in-band link to a low-latency mode;
determine a presence of an error on the in-band link; and
store the error on the in-band link in an error log register associated with the retimer.

18. The one or more non-transitory computer-readable media of claim 17, the instructions to cause the apparatus to:
set the in-band link to a non-low-latency mode;
retrieve the error on the in-band link from the error log register using the in-band link; and
clear the error log register.

19. The one or more non-transitory computer-readable media of claim 15, the instructions to cause the apparatus to:
set a multiplexer at the retimer to a low-latency mode of operation;
determine an error in the in-band link, the in-band link configured to transmit Control SKP OS at a predetermined interval;
encode Control SKP OS with link management information based on the determined error in the in-band link;
set the multiplexer to a bypass input at the start of the predetermined interval;
transmit the Control SKP OS into the bit stream; and
set the multiplexer to the low-latency mode of operation after the predetermined interval.

20. A system comprising:
an upstream device comprising a downstream port;
a retimer comprising:
a configuration register comprising a link management bit set, and one or more bit fields for link management bits indicating a link management command;
bit stream logic implemented at least partially in hardware to encode an ordered set (OS) with one or more link management bits from the configuration register; and
a multi-lane link coupling the downstream port with the retimer;
the retimer to:
detect an error in a bit stream at the retimer;
encode a control skip ordered set (Control SKP OS) with the link management command based on the error detected in the bit stream; and
transmit the Control SKP OS to the downstream port across the multi-lane link.

21. The system of claim 20, the system comprising an error log register associated with the retimer, wherein the multi-lane link is an in-band link, the retimer to:
set the in-band link to a low-latency mode;
determine a presence of an error on the in-band link;
store the error on the in-band link in the error log register;
set the in-band link to a non-low-latency mode;
retrieve the error on the in-band link from the error log register using the in-band link; and
clear the error log register.

22. The system of claim 20, the system comprising a multiplexer, wherein the multi-lane link is an in-band link, the retimer to:
set the multiplexer at the retimer to a low-latency mode of operation;
determine an error in the in-band link, the in-band link configured to transmit Control SKP OS at a predetermined interval;
encode Control SKP OS with link management information based on the determined error in the in-band link;
set the multiplexer to a bypass input at the start of the predetermined interval;
transmit the Control SKP OS into the bit stream; and
set the multiplexer to the low-latency mode of operation after the predetermined interval.

23. The method of claim 10, wherein the one or more link management bits indicate a link management command, wherein the link management command is a link retraining request, a link re-equalization request, or a power management request.

* * * * *